(12) United States Patent
De Ridder et al.

(10) Patent No.: US 10,649,638 B2
(45) Date of Patent: May 12, 2020

(54) IMMERSIVE MEDIA CONTENT NAVIGATION AND EDITING TECHNIQUES

(71) Applicant: Adobe Inc., San Jose, CA (US)

(72) Inventors: Yaniv De Ridder, San Francisco, CA (US); Michael Spencer Cragg, Berkeley, CA (US); Benjamin Adam Farrell, Oakland, CA (US)

(73) Assignee: Adobe Inc., San Jose, CA (US)

( * ) Notice: Subject to any disclaimer, the term of this patent is extended or adjusted under 35 U.S.C. 154(b) by 178 days.

(21) Appl. No.: 15/889,628

(22) Filed: Feb. 6, 2018

(65) Prior Publication Data
US 2019/0243530 A1 Aug. 8, 2019

(51) Int. Cl.
| G06F 3/0481 | (2013.01) |
| G06F 3/0484 | (2013.01) |
| G11B 27/036 | (2006.01) |
| G06F 3/0482 | (2013.01) |
| G06T 3/00 | (2006.01) |

(52) U.S. Cl.
CPC ........ G06F 3/04845 (2013.01); G06F 3/0482 (2013.01); G06F 3/04817 (2013.01); G06T 3/0031 (2013.01); G11B 27/036 (2013.01)

(58) Field of Classification Search
CPC ... G06F 3/04815; G06F 3/0346; G06T 15/20; G06T 3/0062; G06T 11/60; G09G 5/14
See application file for complete search history.

(56) References Cited

U.S. PATENT DOCUMENTS

| 90,149,941 | | 5/2019 | DiVerdi et al. |
| 2014/0085408 A1* | 3/2014 | Kuo | H04N 5/23238 348/36 |
| 2018/0068639 A1* | 3/2018 | Kim | G06F 3/04815 |
| 2018/0075635 A1* | 3/2018 | Choi | H04N 13/204 |
| 2018/0158171 A1* | 6/2018 | Kim | H04N 21/4728 |
| 2018/0174356 A1* | 6/2018 | You | G06F 3/0482 |

OTHER PUBLICATIONS

"How to Edit 360/VR Video in Premiere Pro CC 2017 (Monoscopic & Stereoscopic)" by Jason Levine, published Apr. 3, 2017 URL: https://www.youtube.com/watch?v=-xNeooQ8tAE (Year: 2017).*

* cited by examiner

*Primary Examiner* — Haoshian Shih
(74) *Attorney, Agent, or Firm* — SBMC

(57) ABSTRACT

Techniques and systems to support immersive media content navigation and editing are described. A two-dimensional equirectangular projection of a spherical video is generated by a computing device and displayed in a navigator portion of a user interface of a content editing application. A visual position indicator, indicative of a position within the spherical video, is displayed over the 2D equirectangular projection of the spherical video. A portion of the spherical video is determined based on the position, and a planar spherical view of the portion of the spherical video is generated by the computing device and displayed in a compositor portion of the user interface. The navigator portion and the compositor portion are linked such that user input to the navigator portion or the compositor portion of the user interface causes corresponding visual changes in both the navigator portion and the compositor portion of the user interface.

20 Claims, 17 Drawing Sheets

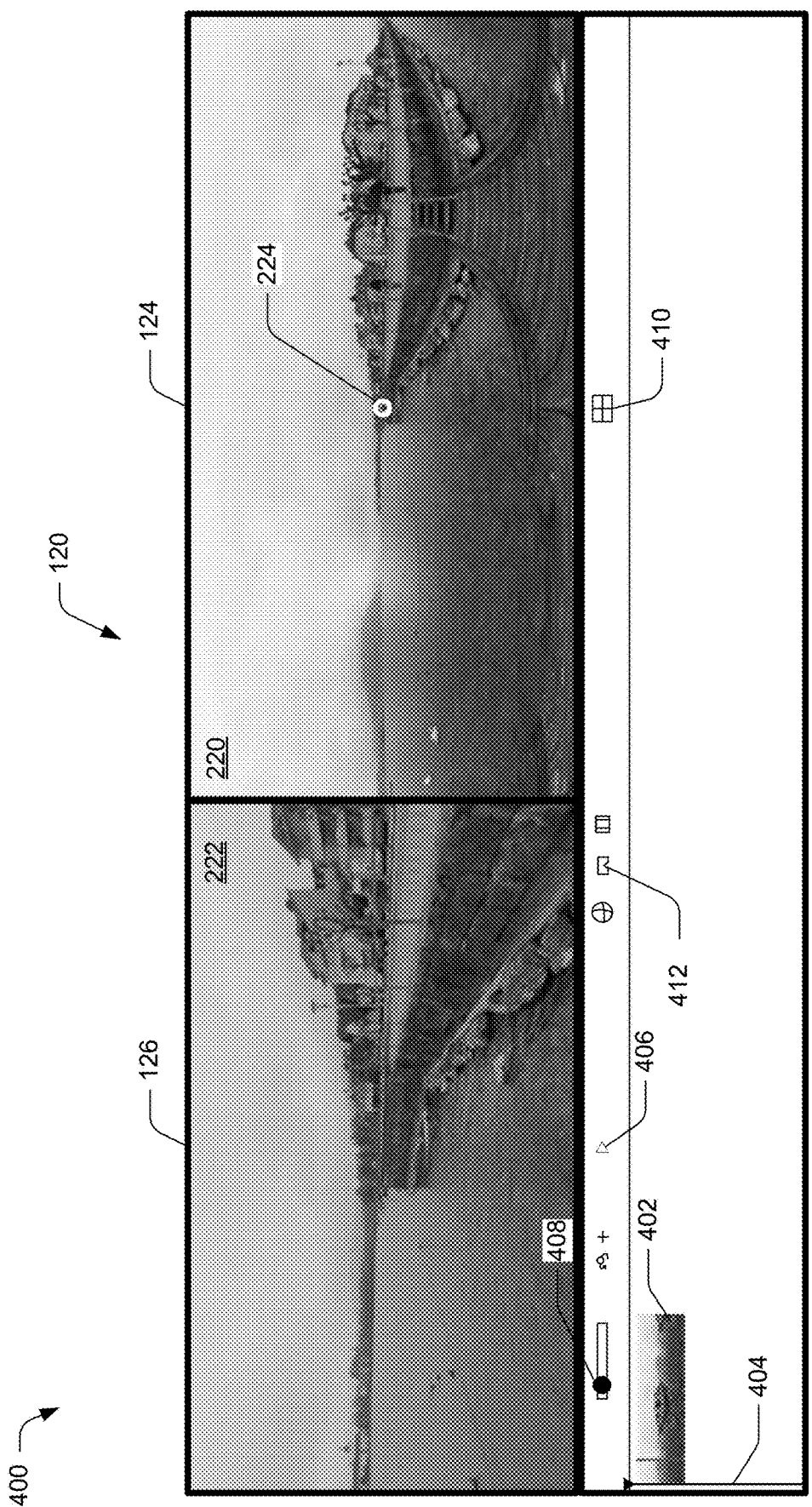

IMMERSIVE MEDIA CONTENT NAVIGATION AND EDITING TECHNIQUES

BACKGROUND

Immersive media content, such as 360 degree spherical video or virtual reality (VR) video, expands an ability of a user to interact with video as compared to conventional two-dimensional video, such as to look at different portions of a spherical video output through rendering of the spherical video. VR video may be configured for output using a VR device configured as a headset (e.g., an immersive head-mounted display) that blocks all views of the outside world. While providing an immersive view of the VR video, it is difficult to edit VR videos while wearing a headset. Thus, in order to edit such spherical video content, various spherical video plugins have emerged for content editing applications. Such spherical video plug-ins often present a single view of the spherical video content, such as a projection of the spherical video onto a two-dimensional surface. However, it is difficult for users to view and readily understand such 2D projections due to an appearance of distortion that occurs when a spherical video is redefined to follow two dimensions. Accordingly, users of conventional content editing systems are forced to switch back and forth between viewing the projection of the spherical video in the content editing application and wearing a headset to view the spherical video, which is inefficient and frustrating for editors of spherical video content.

Additionally, conventional content editing applications fail to provide a comprehensive set of editing tools for users to understand and directly manipulate immersive media content. For example, immersive media content may include various different types of content that an user may wish to edit including, by way of example and not limitation, spherical video, spherical audio, visual objects such as 2D or 3D images or videos, and audio captured by a mono audio source positioned in 3D space. Conventional techniques, however, often require separate applications to edit each type of content which increases the time and difficulty of creating and editing immersive media content experiences.

Furthermore, conventional techniques make it difficult to place and manipulate content, such as 2D images or mono audio, within the spherical video. For example, such conventional techniques often utilize sliders to rotate or transform content placed an immersive environment such as by utilizing the sliders to modify the pitch, yaw, or roll of the content. However, sliders and other tools of conventional content editing techniques are disconnected from the content itself which makes it difficult for users to quickly and easily add and manipulate immersive media content.

SUMMARY

Techniques and systems to support immersive media content navigation and editing are described. In one or more implementations, a two-dimensional (2D) equirectangular projection of a spherical video is generated by a computing device and displayed in a navigator portion of a user interface of a content editing application. A visual position indicator, indicative of a position within the spherical video, is displayed over the 2D equirectangular projection of the spherical video by the computing device. A portion of the spherical video is determined by the computing device based on the position, and a planar spherical view of the portion of the spherical video is generated by the computing device and displayed in a compositor portion of the user interface. The navigator portion and the compositor portion are linked such that user input to the navigator portion or the compositor portion of the user interface causes corresponding visual changes in both the navigator portion and the compositor portion of the user interface. For example, user input to navigate to a different position within the spherical video, that is received via either the navigator portion or the compositor portion of the user interface, causes corresponding visual changes in both the navigator portion and the compositor portion of the user interface. The content editing application is further configured to enable the direct manipulation of various types of immersive content via the user interface, including spherical video, spherical audio, visual objects, and the mono audio.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of at least one entity and thus reference may be made interchangeably to single or plural forms of the entities in the discussion.

FIGS. 4A, 4B, 4C, and 4D which depict example implementations of the user interface of the content editing application in accordance with various implementations.

DETAILED DESCRIPTION

Overview

Figure 1:
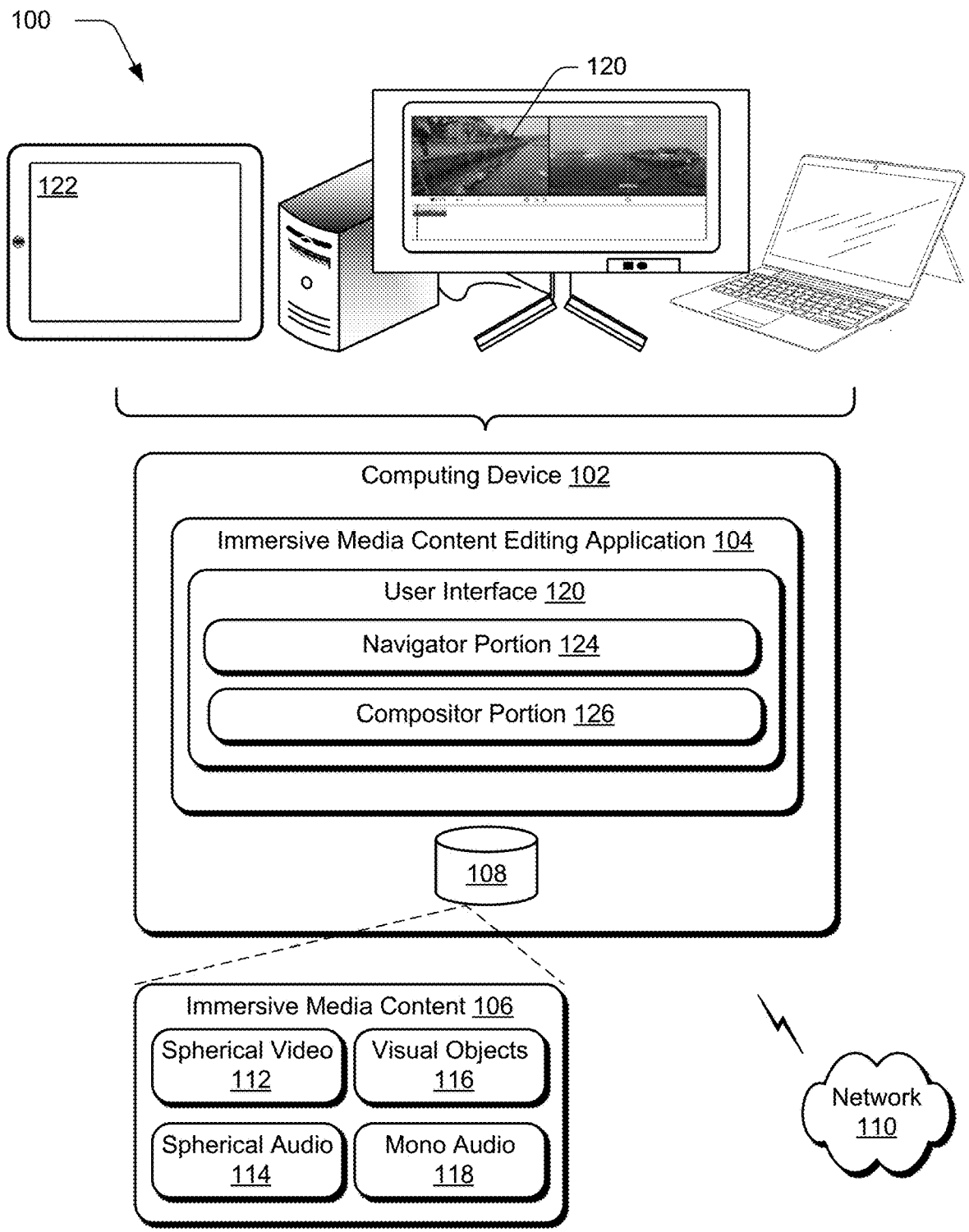
FIG. 1 is an illustration of a digital medium environment in an example implementation that is operable to employ techniques described herein.

Techniques and systems to support immersive media content navigation and editing are described. The described techniques and systems support efficient editing of immersive media content using a content editing application. The content editing application enables navigation through immersive media content by displaying a user interface on a two-dimensional display screen which includes both a navigator portion to display a first view of the immersive media content and a compositor portion, proximate the navigator portion, to display a second view of the immersive media content. In one example, the content editing application generates a two-dimensional (2D) equirectangular projection of a spherical video in the navigator portion of the user interface along with a visual element indicating a position within the spherical video. Concurrent with the display of the equirectangular projection, the content editing application displays a planar spherical view of a portion of the spherical video. The portion of the spherical video is centered around the position indicated by the visual element in the navigator portion of the user interface. The visual element, therefore, indicates the relationship between the views of the spherical video displayed in the navigator portion and the compositor portion of the user interface.

The 2D equirectangular projection maps the 360 degree spherical video to a 2D surface, and thus enables a user to view the entire 360 degree environment of the spherical video as 2D content. As such, the 2D equirectangular projection displayed in the navigator portion provides a "map" of the immersive media content environment, and enables the user to quickly and efficiently navigate to different positions within the immersive media content.

In contrast, the planar spherical view of the portion of the spherical video corresponds to a 2D projection of what a user wearing a head-mounted display device to view the spherical video would see at a given position and orientation within the 360 degree environment of the spherical video. Thus, the planar spherical view is ideal for editing the immersive media content as well as previewing what the user will see when wearing the headset.

The concurrent display of the navigator portion and the compositor portion enables the user to view both the entire 360 degree environment in the navigator portion along with a view of what a user wearing a head-mounted display device to view the spherical video would see at a given position within the compositor portion. Doing so increases the efficiency of editing immersive media content, especially when compared to conventional systems and techniques which display a single view of the immersive media content which is often distorted.

The content editing application enables navigation through the spherical video via user input to either of the navigator portion or the compositor portion of the user interface. Advantageously, the navigator portion and the compositor portion are linked such that user input to either the navigator portion or the compositor portion of the user interface causes corresponding visual changes in both the navigator portion and the compositor portion of the user interface. For example, a user can navigate through the spherical video by selecting a different position within the navigator portion of the user interface, or by dragging the visual position indicator to the different position within the navigator portion of the user interface. In response to navigation via the navigator portion, the content editing application modifies the compositor portion to display the planar spherical view of an different portion of the spherical video corresponding to the different position. Similarly, user input to the compositor portion to navigate to a different position, causes the content editing application to display the visual position indicator at the different position in the navigator portion of the user interface.

Unlike conventional content editing systems and techniques which require the user to utilize several different applications to edit different types of content, the content editing application described herein provides a comprehensive set of editing tools which enables the user to directly manipulate a variety of different types of immersive media content, such as spherical video, spherical audio, visual objects (e.g., 2D or 3D images or videos), and mono audio content. The ability to add and edit all different types of immersive media content within a single content editing application enables the user to efficiently create and edit immersive media content experiences.

The content editing application provides direct manipulation based controls which enable the user to place and edit immersive media content intuitively and in context, which is an improvement over conventional systems which utilize sliders in a disconnected panel. As an example, the content editing application enables direct manipulation of the visual objects via user input to the navigator portion or the compositor portion of the use interface, such as by clicking and dragging the visual object in order to move the visual object, resize the visual object, and so forth. Further, the "map like" 2D equirectangular projection of the spherical content displayed in the navigator portion of the user interface enables the user to quickly position content at any location within the spherical video.

The content editing application also enables direct manipulation of spherical video by the user to rotate the spherical video on the yaw, pitch, or roll axis around the center of the sphere of the immersive media content environment. When the spherical video is first added to the content editing application, the content editing application displays a textured grid to indicate that the spherical video can be selected and rotated. The content editing application also enables the user to add spherical audio to the spherical video, and to directly manipulate the spherical audio in a manner similar to the direct manipulation of spherical video. Advantageously, the content editing application displays visual elements indicative of the source of the spherical audio, so that the user can visualize where the audio is coming from. In contrast, conventional systems and techniques require the user to listen to the audio in order to determine the source of the audio, which is often inaccurate. In many cases, the spherical audio may be offset from the spherical video in position or time. The content editing application makes it easy for the user to correct this offset and align the spherical audio with the spherical video via direct manipulation of the spherical audio via the user interface. For example, the user can click and drag the spherical audio sphere to align the visual elements of the spherical audio with the source of the audio in the spherical video The content editing application also enables the user to add mono audio to the spherical video, and to directly manipulate the mono audio in a manner similar to the direct manipulation of visual objects. When a mono audio file is first added to the content editing application, the content editing application displays a visual audio icon to represent the position of the mono audio file within the spherical video. The position of the mono audio file can then be adjusted by selecting and dragging the visual audio icon to any position within the spherical video.

Example Environment

FIG. 1 is an illustration of a digital medium environment 100 in an example implementation that is operable to employ techniques described herein. The illustrated environment 100 includes a computing device 102, which may be configured in a variety of ways. The computing device 102, for instance, may be configured as a desktop computer, a laptop computer, a mobile device (e.g., assuming a hand-held configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 12.

The computing device 102 is illustrated as including an immersive media content editing application 104 ("content editing application 104"). The content editing application 104 represents functionality of the computing device 102 to navigate and/or edit immersive media content, such as 360 degree spherical video ("spherical video"), 360 degree spherical audio ("spherical audio"), as well as other types of media content which can be placed within an immersive media environment, such as visual objects (e.g., 2D or 3D images or videos), mono audio, and so forth. By way of example, the content editing application 104 may enable a client device user to interact with application interfaces presented via the computing device 102 to perform various immersive media content editing operations, such as editing spherical video, editing spherical audio, adding and editing visual objects in the spherical video, adding and editing audio in the spherical video, and so forth. The content editing application 104 may facilitate other immersive media content editing operations without departing from the spirit or scope of the techniques described herein. The content editing application 104 may further be representative of more than one application that supports functionality to perform immersive media content editing operations without departing from the spirit or scope of the techniques described herein.

The immersive media content relative to which the content editing application 104 is configured to perform operations are represented by immersive media content 106, which is illustrated as maintained in storage 108 of the computing device 102. Although the immersive media content 106 is illustrated as being maintained in the storage 108, the immersive media content 106 may also represent immersive media content or other digital content to be included within the immersive media content that is accessible to the computing device 102 in other ways, e.g., accessible to the computing device 102 from storage of another device over network 110. In such implementations, the computing device 102 may represent functionality to perform the depicted immersive media content navigation and editing techniques described above and below for other devices, e.g., to offload some of the computing burden of doing so from those devices. In other words, the computing device 102 may be configured to provide immersive media content navigation and editing as a service—and thus be considered associated with a service provider.

The immersive media content 106 may represent various types of immersive media content without departing from the spirit or scope of the techniques described herein. In FIG. 1, the immersive media content 106 is illustrated as including spherical video 112, spherical audio 114, visual objects 116, and mono audio 118. Spherical video 112, as described herein, corresponds to a 360 video or environment captured using a 360 degree video capturing device, e.g., a spherical video camera. Thus, spherical video 112 may correspond to virtual reality video, augmented reality video, and so forth. Spherical audio 114, as described herein, corresponds to 360 degree audio captured using a 360 degree audio capturing device, e.g., a 360 degree ambisonics microphone. Visual objects 116, as described herein, correspond to 2D or 3D images or videos which can be placed within an immersive media environment, such as by placing a 2D logo within a spherical video 112. Mono audio 118, as described herein, corresponds to audio captured using a mono microphone, which can then be placed within the immersive media environment as a post editing step.

Oftentimes, the hardware device used to capture spherical video and audio are different. For example, spherical video may be captured using a 360 degree spherical video camera device, and spherical audio can be captured using a different 360 degree spherical microphone device. Unlike existing editing systems and techniques, the content editing application 104 described herein enables the user to navigate and edit both spherical video and spherical audio, as well as place and edit visual objects 116 and mono audio 118 in an immersive media environment.

To enable immersive media content navigation and editing, the content editing application 104 displays a user interface 120 on one or more displays 122 of the computing device 102 to enable the user to navigate through the immersive media content 106 and perform various immersive media content editing operations. Unlike existing systems and techniques for editing immersive media content, the user interface 120 concurrently displays a navigator portion 124 which includes a 2D equirectangular projection of a spherical video 112 and, and a compositor portion 126 which includes a planar spherical view of a portion of the spherical video 112. The 2D equirectangular projection maps the 360 degree spherical video to a 2D surface, and thus enables a user to view the entire 360 degree environment of the spherical video as 2D content. The planar spherical view of the portion of the spherical video corresponds to a 2D projection of what a user wearing a head-mounted display device to view the spherical video would see at a given position and orientation within the 360 degree environment of the spherical video. Thus, the concurrent display of the navigator portion and the compositor portion enables the user to view both the entire 360 degree environment in the navigator portion 124 along with a view of what a user wearing a head-mounted display device to view the spherical video would see at a given position within the compositor portion 126.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
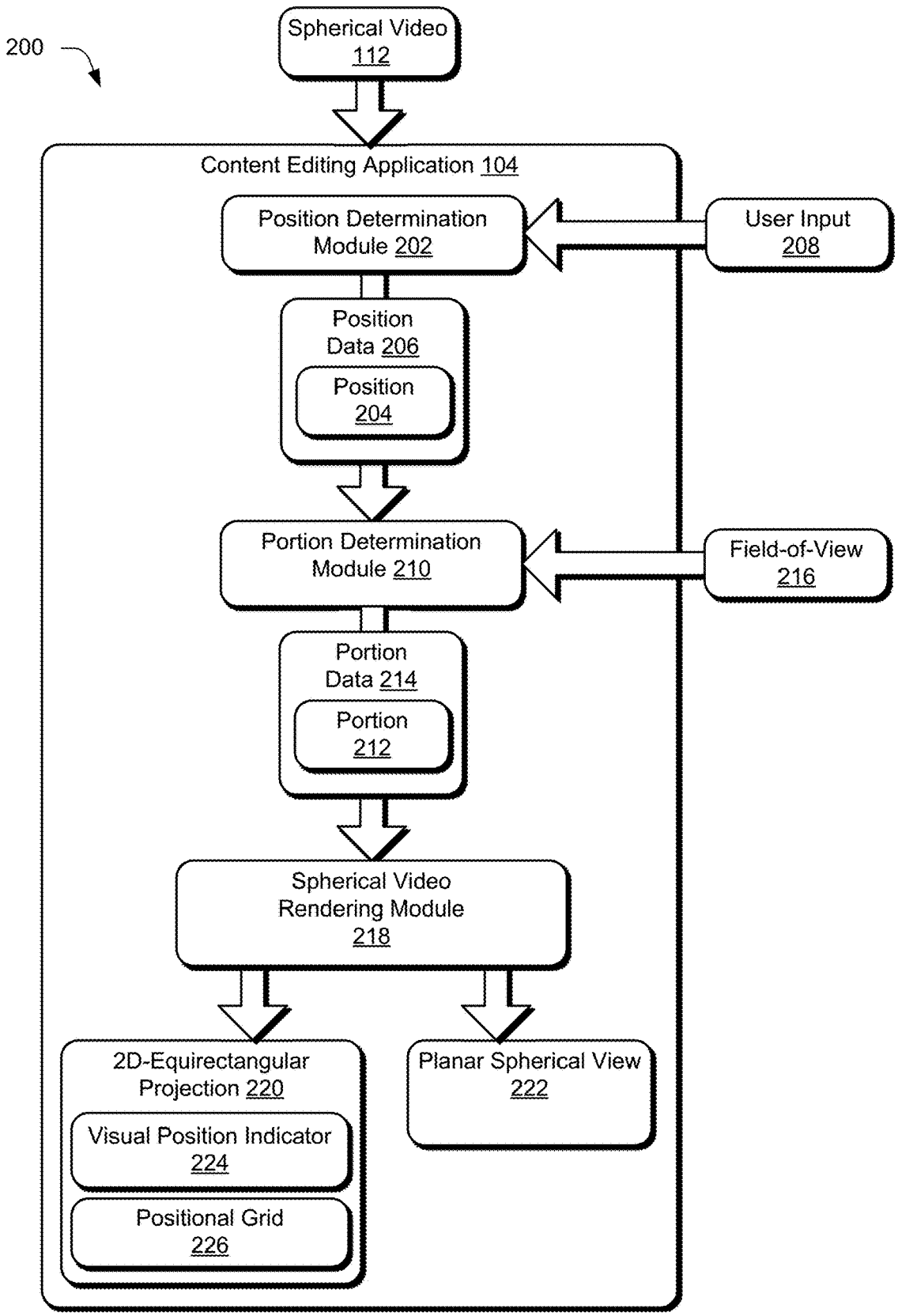
FIG. 2 depicts an example implementation showing the concurrent generation of a 2D equirectangular projection of spherical video and a planar spherical view of a portion of the spherical video for display in the navigator portion and the compositor portion, respectively, of the user interface.

FIG. 2 depicts an example implementation 200 showing the concurrent generation of a 2D equirectangular projection of spherical video and a planar spherical view of a portion of the spherical video for display in the navigator portion 124 and the compositor portion 126, respectively, of the user interface 120.

In example 200, the content editing application 104 receives a spherical video 112, such as when a user of the content editing application 104 loads or adds the spherical video 112 using the content editing application 104. A position determination module 202, of the content editing application 104, determines a position 204 within the spherical video 112, and generates position data 206 indicative of the position 204. The position 204, for example, corresponds to a position in 360 degree space and time within the spherical video 112. As a default, the position 204 may initially correspond to a center point within an initial frame of the spherical video 112 (e.g., at time=0). As discussed in more detail below, however, the position determination module 202 continuously monitors user interaction with the spherical video 112 via the content editing application 104, and adjusts the position 204 in real time based on user input 208 to the user interface 120 of the content editing application 104.

A portion determination module 210 of the content editing application 104 receives the position data 206 from position determination module 202, and determines a portion 212 of the spherical video 112 based on the position 204 indicated by the position data 206, and generates portion data 214 indicative of the portion 212. The portion 212, for example, corresponds to a portion 212 of the spherical video 112 that is viewable at the position 204 indicated by the position data 206 if the user were viewing the spherical video 112 with a head-mounted-display device. The portion 212 is also determined by the portion determination module 210 based on a field-of-view 216 representative of the field-of-view of a head mounted display device. As a default, the field-of-view 216 may correspond to a "safe zone" field-of-view that is viewable within a wide variety of different head-mounted display devices.

A spherical video rendering module 218, of the content editing application 104, receives the position data 206 and portion data 214, and concurrently generates both a 2D equirectangular projection 220 of the spherical video 112 and a planar spherical view of the portion 212 of the spherical video 112 based on the position data and the portion data.

Figure 3:
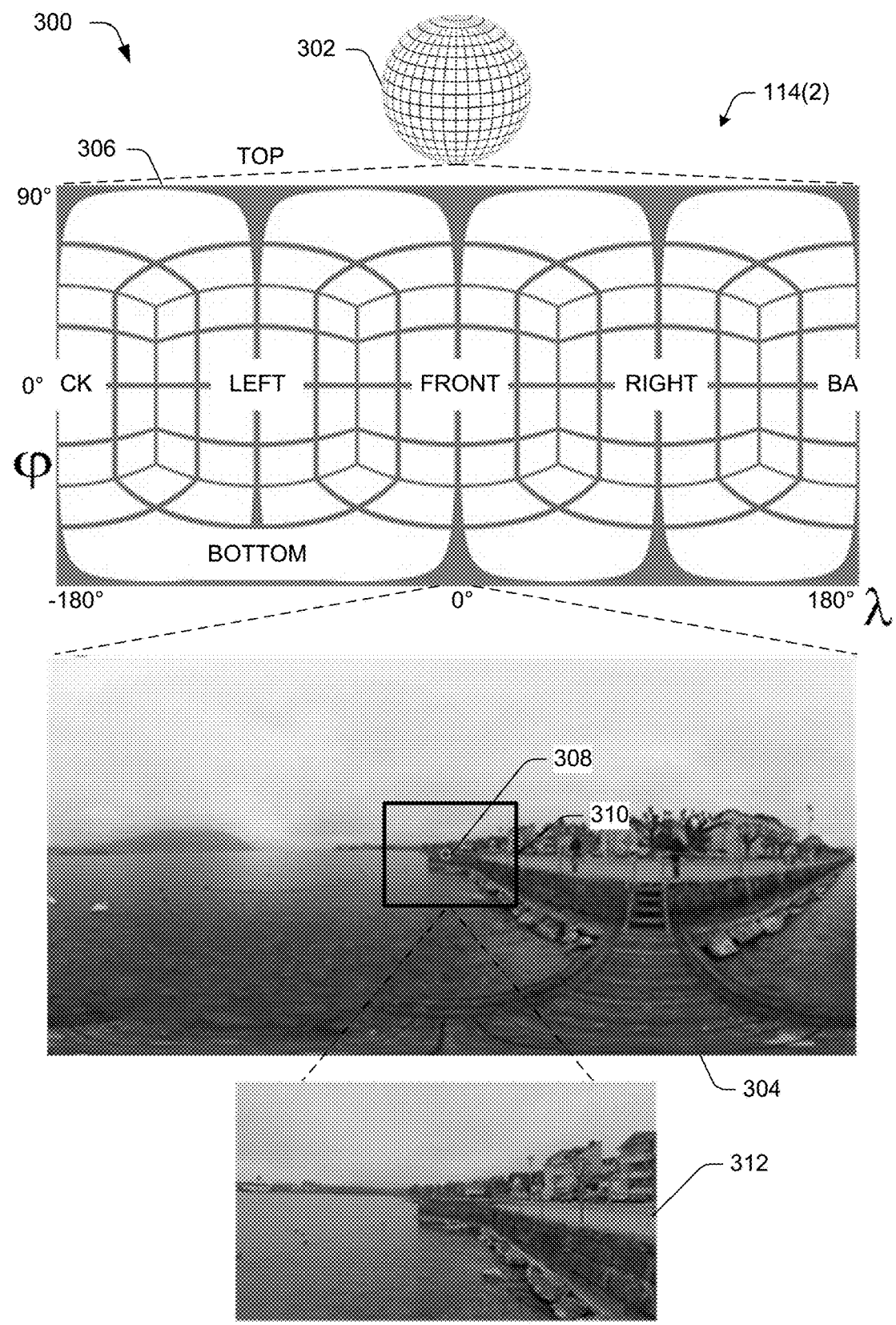
FIG. 3 depicts an example implementation of rendering a 2D equirectangular projection of spherical video and a planar spherical view of a portion of the spherical video.

Consider, for example, FIG. 3 which depicts an example implementation 300 of rendering a 2D equirectangular projection of spherical video and a planar spherical view of a portion of the spherical video. In this example, spherical video 112 is depicted as a sphere 302 which is representative of a 360 degree spherical environment. A 2D equirectangular projection 304 of the spherical video 112 can be generated, by the spherical video rendering module 218, using a coordinate system 306 which utilizes a standard latitude (phi) and longitude (lambda) coordinates that are similar to coordinates used for globes and maps of Earth. Any other coordinate system may be used without departing from the scope of the techniques and systems described herein.

In the illustrated example, the current position 308 corresponds to the center point of the spherical video 112. Based on the position, the portion determination module determines a portion of the spherical video. A visual border 310, representative of a portion of the spherical video 112, is depicted around the position 308 in the 2D equirectangular projection 304. The spherical content rendering module also generates a planar spherical view 312 of the portion of the spherical video 112.

As discussed throughout, the content editing application 104 displays the 2D-equirectangular projection 220 of the spherical video in the navigator portion 124 of user interface 120, and displays the planar spherical view 222 of the portion 212 of the spherical video 112 in the compositor portion 126 of the user interface 120. In one or more implementations, in order to visually indicate the relationship between the 2D equirectangular projection of the spherical video 112 and the planar spherical view of the portion of the spherical video, the content editing application 104 displays a visual position indicator 220 over the 2D equirectangular projection 220 to visually indicate the position 204 within the spherical video 112.

Consider now, FIGS. 4A, 4B, 4C, and 4D which depict example implementations of the user interface 120 of the content editing application 104 in accordance with various implementations.

In FIG. 4A, the user interface 120 of content editing application 104 includes navigator portion 124 which displays the 2D equirectangular projection 220 of the spherical video 112 and compositor portion 126 which displays the planar spherical view 222 of the portion of the spherical video 112. The content editing application display the visual position indicator 224 over equirectangular projection 220 in the navigator portion 124 to visually indicate the current position 204 within the spherical video 112. Notably, the position 204 indicated by the visual position indicator 224 corresponds to the center point of the planar spherical view 222 of the portion 212 of the spherical video 112 displayed in the compositor portion 126 of the user interface 120.

In this example, user interface 120 of the content editing application 104 further includes a spherical video indicator 402 corresponding the spherical video 112 loaded into the content editing application 104, a timeline control 404, a play control 406, a zoom control 408, a grid control 410, and a field-of-view control 412. The timeline control 404 is initially set to the beginning frame of the of the spherical video 112, as indicated by the arrow pointing to the beginning of the spherical video indicator 402. Playback of the spherical video 112 can be initiated by selecting the play control 406. Individual frames of the spherical video 112 may be selected by moving the timeline control 404 forwards or backwards to jump to various times within the spherical video 112. The zoom control 408 enables the user to zoom in or out on the planar spherical view 222 of the spherical video, which notably does not change the position of the visual position indicator 224 in the navigator portion 124 of the user interface 120.

In one or more implementations, the content editing application 104 is configured to display a positional grid 226 over the 2D equirectangular projection 220 of the spherical video 112 to indicate an orientation or direction within the 360 degree environment of the spherical video 112, such as forward, backward, up, down, left, and right. Consider, for example, FIG. 4B, in which content editing application 104 displays positional grid 226 over the 2D equirectangular projection 220 of the spherical video 112 in the navigator portion 124 of the user interface 120. The positional grid 226 can be toggled on and off via user input to select the grid control 410.

The content editing application 104 enables navigation through the spherical video 112 via user input 208 to directly manipulate either of the navigator portion 124 or the compositor portion 126 of the user interface 120. Further, the two views of the spherical video 112 are linked, such that direct manipulation to either the navigator portion 124 or the compositor portion 126 causes a corresponding change in the respective other portion of the user interface 120. When user input 208 is received via user interface 120 to navigate through the spherical video 112, the position determination module 202 determines a different position 204 and adjusts the position data 206 to indicate the different position 204. The different position data 206 causes the spherical video rendering module 218 to adjust both navigator portion 124 and the compositor portion 126 of the user interface 120.

For instance, the user can navigate through the spherical video 112 via the navigator portion 124 by selecting and moving the visual position indicator 224 to different positions within the 2D equirectangular projection 220 of the spherical video 112. Additionally, the user can navigate through the spherical video 112 via the navigator portion 124 by clicking, tapping, or selecting any position within the navigator portion in order to cause the visual position indicator 224 to move to the selected position. This functionality enables the user to quickly and efficiently navigate to any position or item of interest within the spherical video 112 via user input 208 to the navigator portion 124. In response to user input to the navigator portion 124 to navigate through the spherical video 112, the position determination module determines a different position 204, and displays the visual position indicator 224 at the different position 204 within the 2D equirectangular projection 220 in the navigator portion 124.

At the same time, the different position 204 determined by the position determination module 202 causes the portion determination module 210 to determine a different portion 212 of the spherical video 112 centered around the different position 204. Then, the spherical video rendering module 218 generates a planar spherical view 222 of the different portion 212 of the spherical video 112. The content editing application 104 displays the planar spherical view 222 of the different portion 212 of the spherical video 112 in the compositor portion 126 of the user interface 120.

Similarly, the user can navigate through the spherical video 112 to a different position via the compositor portion 126 by clicking and dragging on the planar spherical view in the compositor portion 126 of the user interface. In response to the user input to the compositor portion 126 to navigate through the spherical video 112, the position determination module determines a different position 204, the different position 204 determined by the position determination module 202 causes the portion determination module 210 to determine a different portion 212 of the spherical video 112 centered around the different position 204. Then, the spherical video rendering module 218 generates a planar spherical view 222 of the different portion 212 of the spherical video 112. The content editing application 104 displays the planar spherical view 222 of the different portion 212 of the spherical video 112 in the compositor portion 126 of the user interface 120. At the same time, the content editing application 104 displays the visual position indicator 224 at the different position 204 within the 2D equirectangular projection 220 in the navigator portion 124.

Figure 4B:
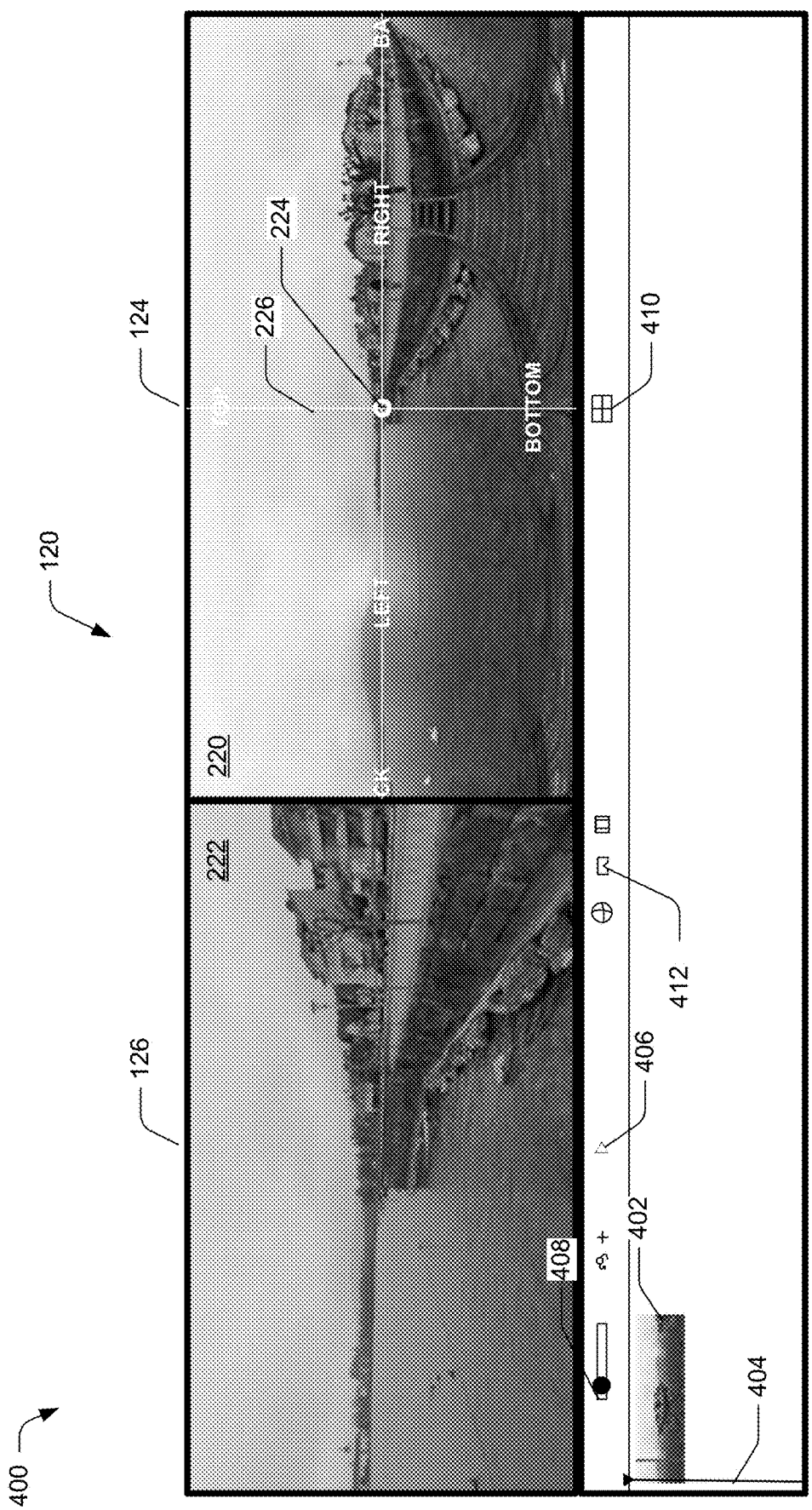
Figure 4C:
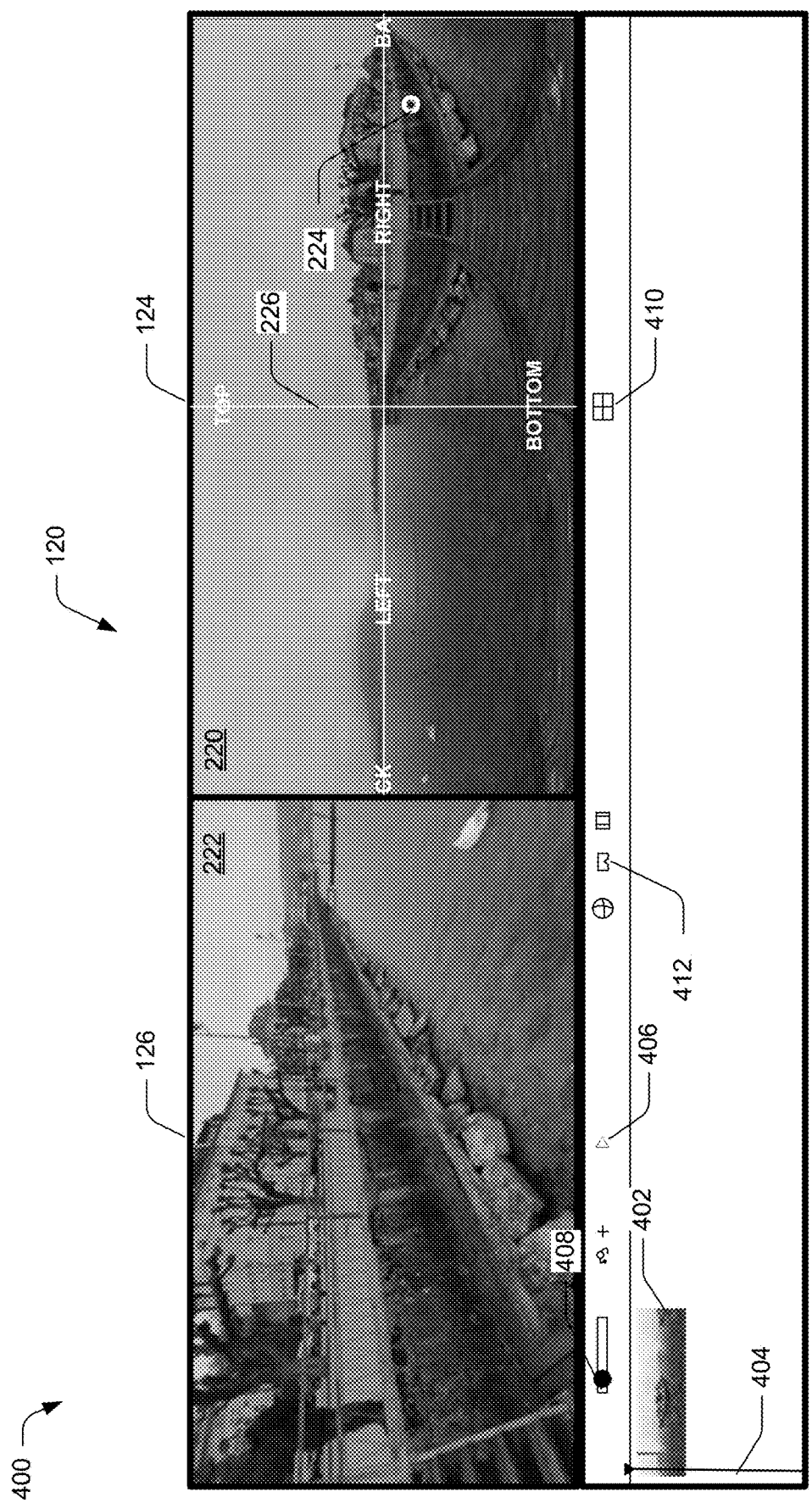

As an example, consider FIG. 4C, in which user input 208 is received to the user interface 120 to navigate from the initial position at the center of the spherical video (as shown in FIG. 4A) to a different position to the bottom right of the center position. As discussed above, the user input can be to either the navigator portion or the compositor portion. In response to the user input 208, the position determination module 202 determines the different position 204 and the portion determination module 210 determines the different portion 212 centered around the different position 204.

The spherical video rendering module 218 then moves the display of the visual position indicator 224 from the centered position to the different position in the navigator portion, which in this example is located to the bottom right from the centered position. At the same time, the spherical video rendering module 218 updates the compositor portion 126 to display a planar spherical view 222 of the different portion which is centered around the different position. Note, for example, that in the navigator portion of the user interface, the visual position indicator points to the a position just right of the dock, and in the compositor portion a planar spherical view of this position is displayed.

As discussed above, the portion determination module 210 determines the portion 212 based on the position 204 and the field-of-view 216. As a default, the compositor portion may select the portion to be within a "safe zone" field-of-view to ensure that the planar spherical view of the portion of the spherical video will be viewable in all different types of head-mounted display devices.

However, the content editing application 104 may also enable the user to adjust the field-of-view 216 to conform to the field-of-view of various different types of head-mounted display devices. The ability to adjust the field-of-view of the spherical video enables the user to visualize how the spherical video content will look for a variety of different types of head-mounted display devices, while also ensuring the spherical video is visible for a given position or orientation across a variety of different head-mounted display devices.

Figure 4D:
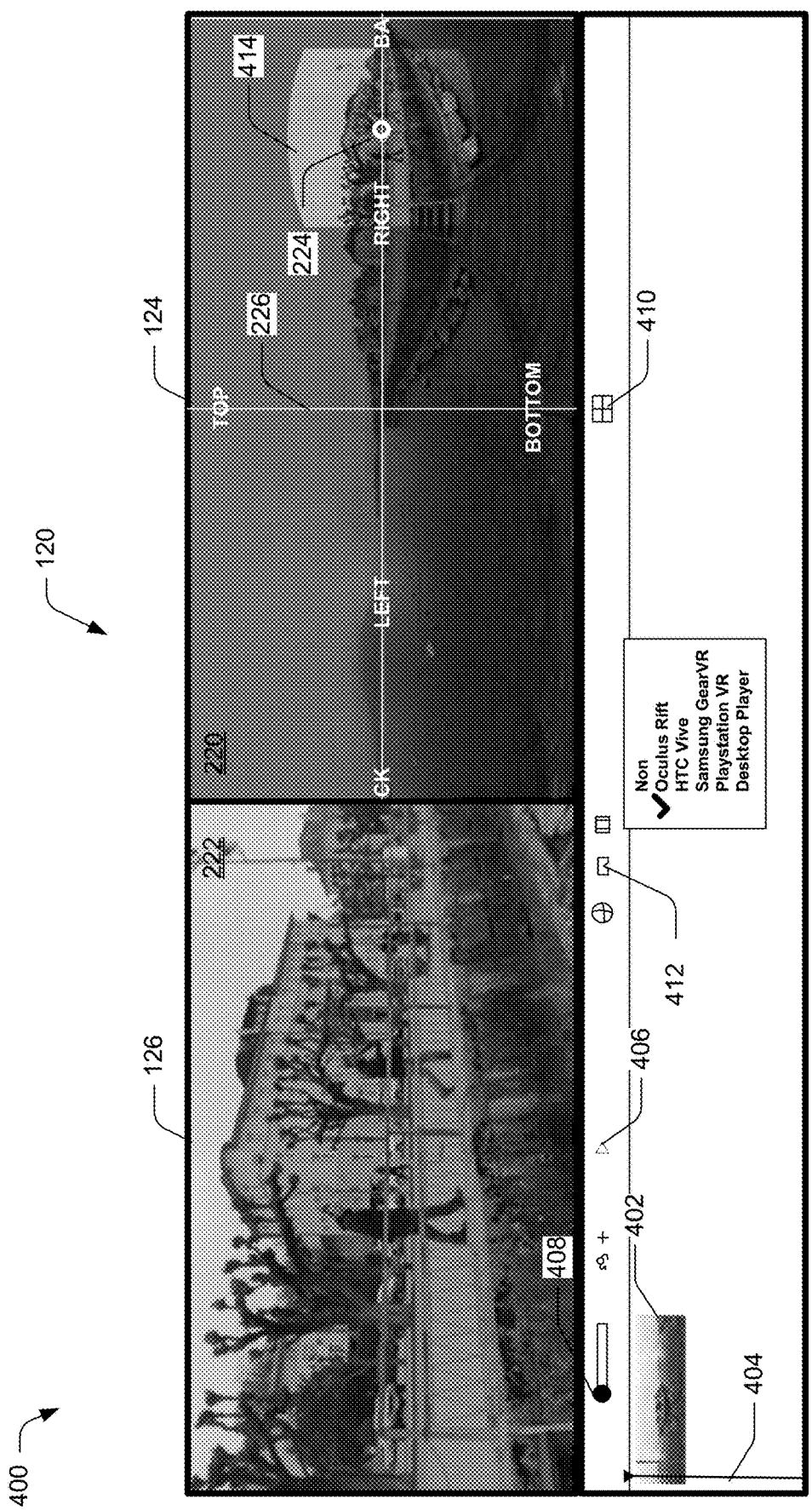

Consider, for example, FIG. 4D in which a user selects the field-of view control 412 from the user interface 120 to cause the content editing application 104 to present a selectable list of available head-mounted display devices, which in this example includes "Oculus Rift", "HTC Vive", "Samsung GearVR", "Playstation VR", and "Desktop Player". Of course, a variety of different types of head-mounted display devices may be added to this list without departing form the spirt or scope of the described techniques.

When the user selects one of the head-mounted display devices from the list, the content editing application 104 adjust the planar spherical view by changing the portion 212 to correspond to the field-of-view of the selected head-mounted display device. For example, in FIG. 4D, the user has selected the "Oculus Rift" headset from the list, and in response the content editing application causes the compositor portion 126 of the user interface 120 to modify the portion of the spherical video to correspond to the field-of-view of the Oculus Rift headset. In this example, the content editing application 104 also modifies the navigator portion 124 to display a field-of-view overlay 414 to indicate the field-of-view of the selected head-mounted display device. Notably, every pixel within the field-of-view overlay 414 in the navigator portion is the same as the portion of the spherical content displayed in the compositor portion 126.

Unlike conventional content editing systems and techniques which require the user to jump between several different applications, the content editing application described herein provides a comprehensive set of editing tools which enables the user to directly manipulate a variety of different types of immersive media content, such as spherical video, spherical audio, visual objects (e.g., 2D or 3D images or videos), and mono audio content. The ability to add and edit all different types of immersive media content within a single content editing application enables the user to efficiently create and edit immersive media content experiences.

Figure 5:
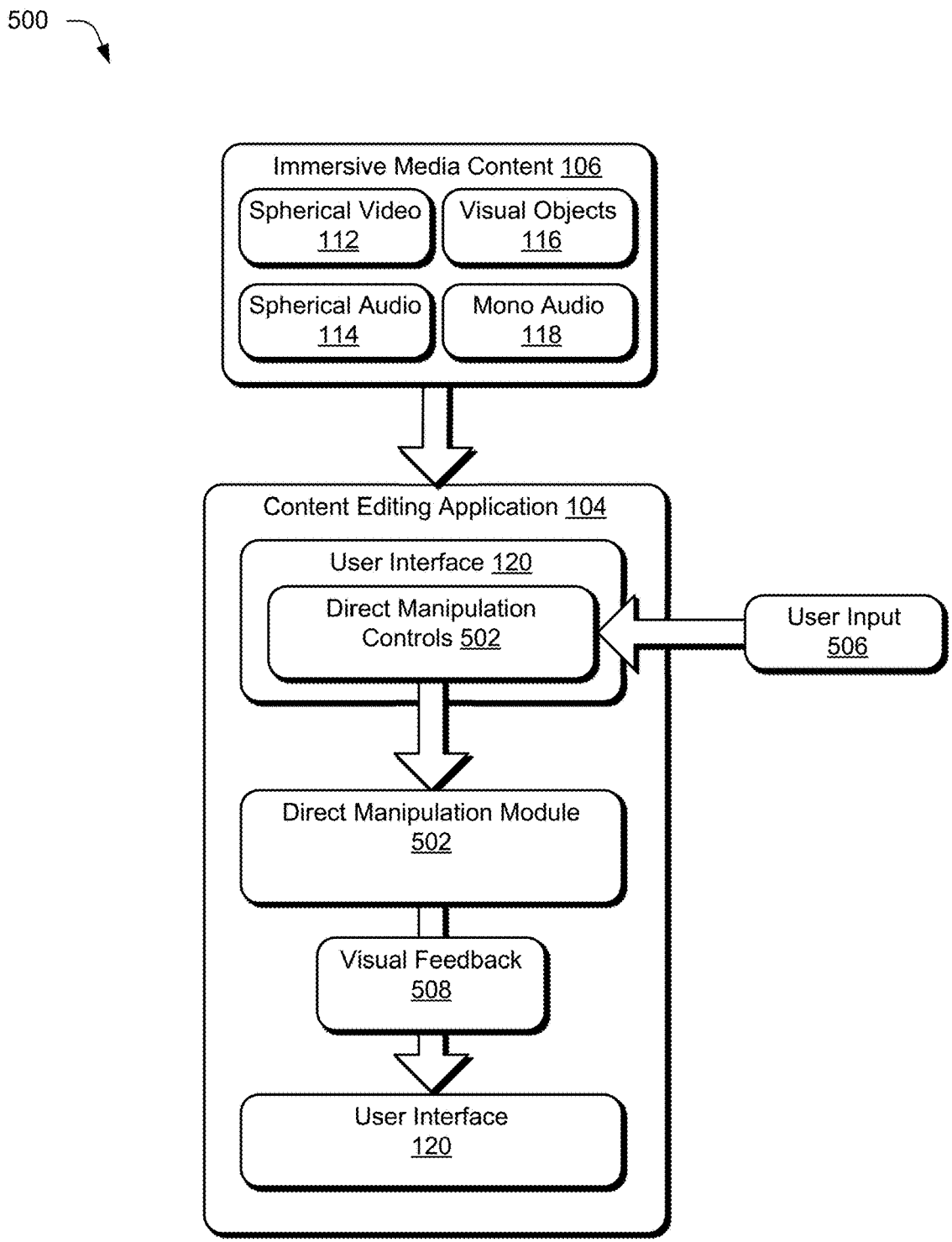
FIG. 5 illustrates an example implementation of direct manipulation of immersive media content in accordance with one or more implementations.

Consider, for example, FIG. 5 which depicts an example implementation 500 of direct manipulation of immersive media content in accordance with one or more implementations.

In this example, the content editing application 104 is illustrated as including a direct manipulation module 502 and direct manipulation controls 504 which are displayed in user interface 120. The direct manipulation module 502 monitors user input 506 to the direct manipulation controls 502 to edit immersive media content 106, such as spherical video 112, spherical audio 114, visual objects 116, and mono audio 118. In response to user input 506 to directly manipulate the immersive media content 106, the direct manipulation module 502 provides visual feedback 508, indicative of the change to the immersive media content 106, for display in the user interface 120, such as by rotating, moving, or resizing the immersive media content.

The content editing application 104 is configured to enable direct manipulation of visual objects 116 within spherical video 112, such as 2D or 3D images or videos. Unlike existing systems and techniques which provide slider controls for manipulation of visual objects, the content editing application 104 enables direct manipulation of the visual objects 116 via user input to the navigator portion 124 or the compositor portion 126 of the user interface 120, such as by clicking and dragging the content to move the object, resize the object, and so forth.

Figure 6:
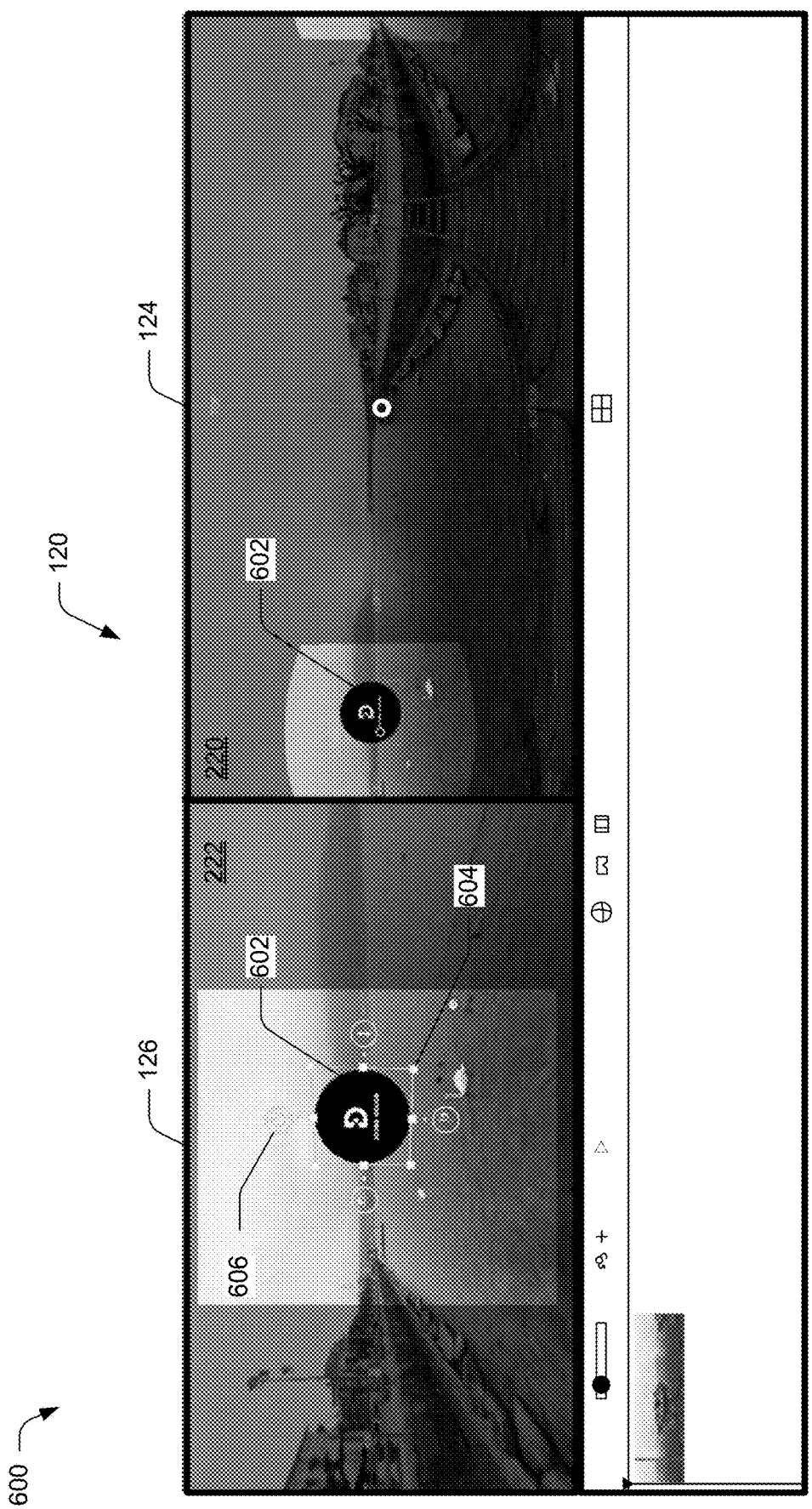
FIG. 6 illustrates an example of direct manipulation of visual objects in accordance with one or more implementations.

As an example, consider FIG. 6, which illustrates an example 600 of direct manipulation of visual objects in accordance with one or more implementations. In this example, a visual object 602, corresponding to a 2D image, has been added to the spherical video 112. When the visual object 602 is added to the spherical video 112, the content editing application 104 displays the visual object 502 in both the compositor portion 126 and the navigator portion 124 of the user interface 120.

The content editing application 104 enables direct manipulation of visual objects 602 using two types of manipulation: orbit and translate. To perform an orbit manipulation, the user can click and drag to orbit the visual object 602 around the sphere such that the object is always facing the center of the sphere of the immersive environment. Doing so provides a convenient way to quickly position a visual object in 3D space in both the compositor and navigator views. Displaying the visual object within the navigator portion 124 enables the user to quickly position the visual object 602 at various positions within the spherical video 112 by clicking and dragging the visual object 602 to a desired position. For example, the user can move an object all the way from the left and then all the way to the right, and up and down and so forth.

Once the visual object is moved to a general position, the translate manipulation can be performed by clicking and dragging the visual object 602 to perform a fine or precise adjustment or positioning of the visual object. For example, in the compositor portion 126, the user can click to select the visual object 602, and in response the content editing application 104 displays a bounding box 604 around the visual object 602 to indicate that the visual object is selected and can be manipulated, along with direct manipulation controls 606. The user can select the direct manipulation controls 606 to manipulate the visual object 602 in a variety of different ways, such as by rotating the object on the Pitch, Yaw, or Roll axis. The direct manipulation controls 606 may also include a control to change the visual object distance relative to its current orientation, which makes placing visual objects into an immersive environment much more natural and intuitive than conventional systems and techniques which utilize slider controls.

The content editing application 104 enables direct manipulation of spherical video 112 by rotating the spherical video 112 on the yaw, pitch, or roll axis around the center of the sphere of the immersive environment. When the spherical video 112 is first added to the content editing application 104, the content editing application 104 displays a direct manipulation controls in the form of a textured grid to indicate that the spherical video 112 can be selected and rotated. Consider, for example, FIGS. 7A and 7B which illustrate examples 700 of direct manipulation of spherical video in accordance with one or more implementations.

Figure 7A:
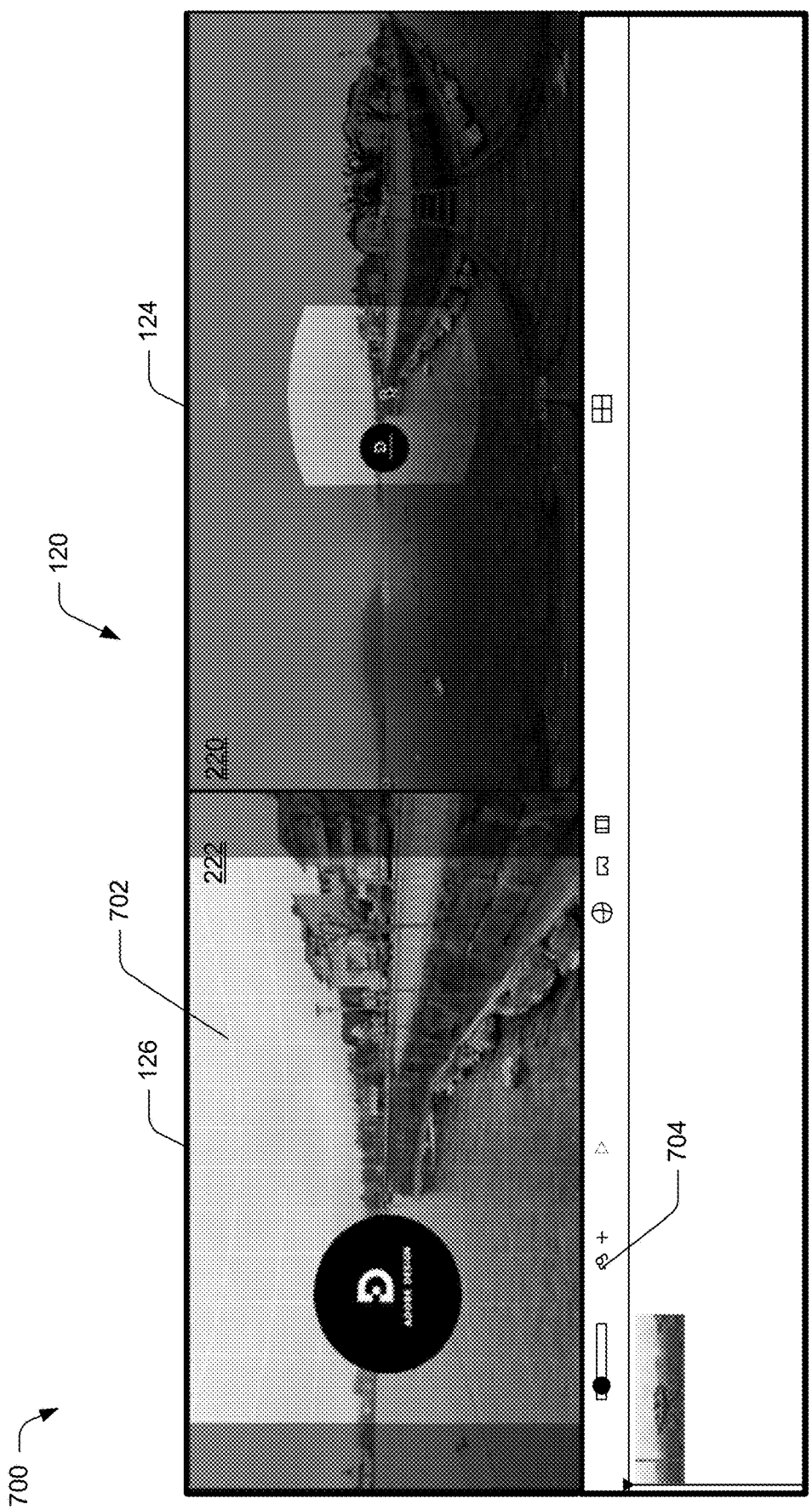
FIGS. 7A and 7B illustrate examples of direct manipulation of spherical video in accordance with one or more implementations.
Figure 7B:
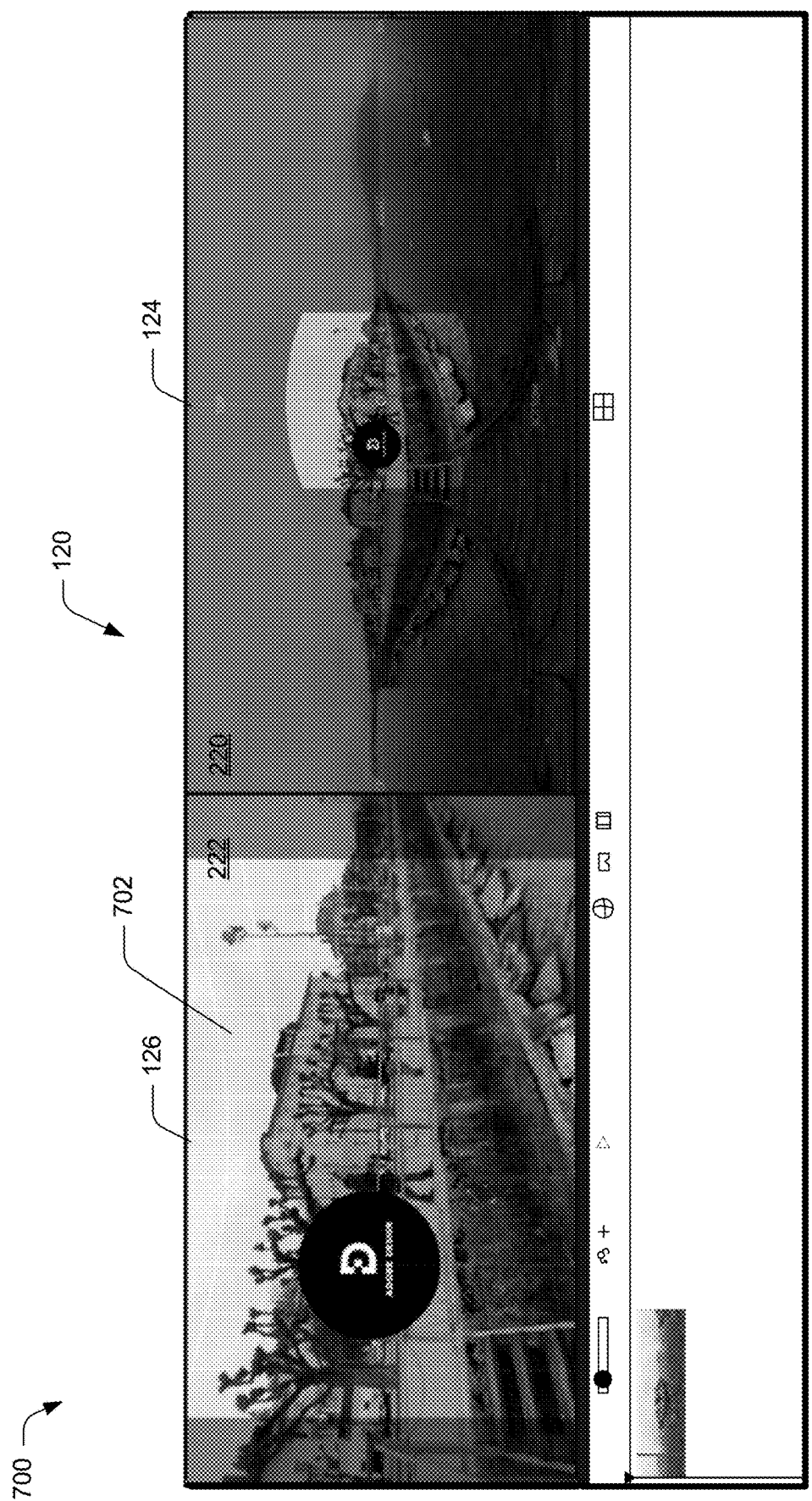

In FIG. 7A, the content editing application 104 displays a textured grid 702 over the planar spherical view 222 of the portion of the spherical video 112 in the compositor portion 126 of the user interface 120. The textured grid 702 indicates to the user that the spherical video 112 can be selected and rotated. The textured grid 702 can be displayed responsive to loading the spherical video 112 into the content editing application 104, or in response to selection of an orbit control 704 from the user interface 120. The textured grid 702 also serves as a visual reference when manipulating the spherical video 112. In some cases, dragging the spherical video 112, causes the spherical video 112 to orbit and be constrained on the Yaw axis. A modifier key can be selected while dragging the spherical video 112 to cause the spherical video 112 to be constrained on either the Pitch or Roll axis. To do so, the user selects one of the horizontal or vertical grid lines of the orbit grid overlay, and rotates in a given direction to cause the spherical video 112 to rotate. Thus, unlike existing solutions which require the user to manipulate spherical video content using sliders, the content editing application 104 utilizes a constrained direct manipulation system which enable the user to directly manipulate the spherical video 112 in a natural manner without the user of sliders.

As an example, in FIG. 7A, suppose the user wishes to rotate the spherical content so that the front center of the spherical video is positioned on the two people to the right of the center in the spherical video of FIG. 7A. To do so, the user can directly manipulate the spherical video 112 by clicking and dragging the spherical video 112 until the two people are positioned directed in the center of the 2D equirectangular projection 220 in the navigator portion 124 of the user interface 120. For example, in FIG. 7B the user rotates the spherical video 112 to the right such that the two people are now positioned directly in the center of the 2D equirectangular projection 220 of the spherical video 112.

Often times a user may have multiple visual or audio objects related to a spherical video and may want to rotate the spherical video but also may apply the same rotation to the other related objects (e.g., visual or audio objects). In order to achieve this, the content editing application allows the user to select any combination of objects, and then rotate the combination of the selected objects.

The content editing application 104 also enables the user to add spherical audio 114 to the spherical video 112, and to directly manipulate the spherical audio 114 in a manner similar to the direct manipulation of spherical video 112. When the spherical audio 114 is first added to the content editing application 104, the content editing application 104 displays direct manipulation controls in the form of a textured grid to indicate that the spherical audio 114 can be selected and rotated. In some cases, the textured grid for spherical audio is visually distinguishable from the textured grid for spherical video (e.g., the textured grid for spherical video is blue and the textured grid for spherical audio is green).

Figure 8A:
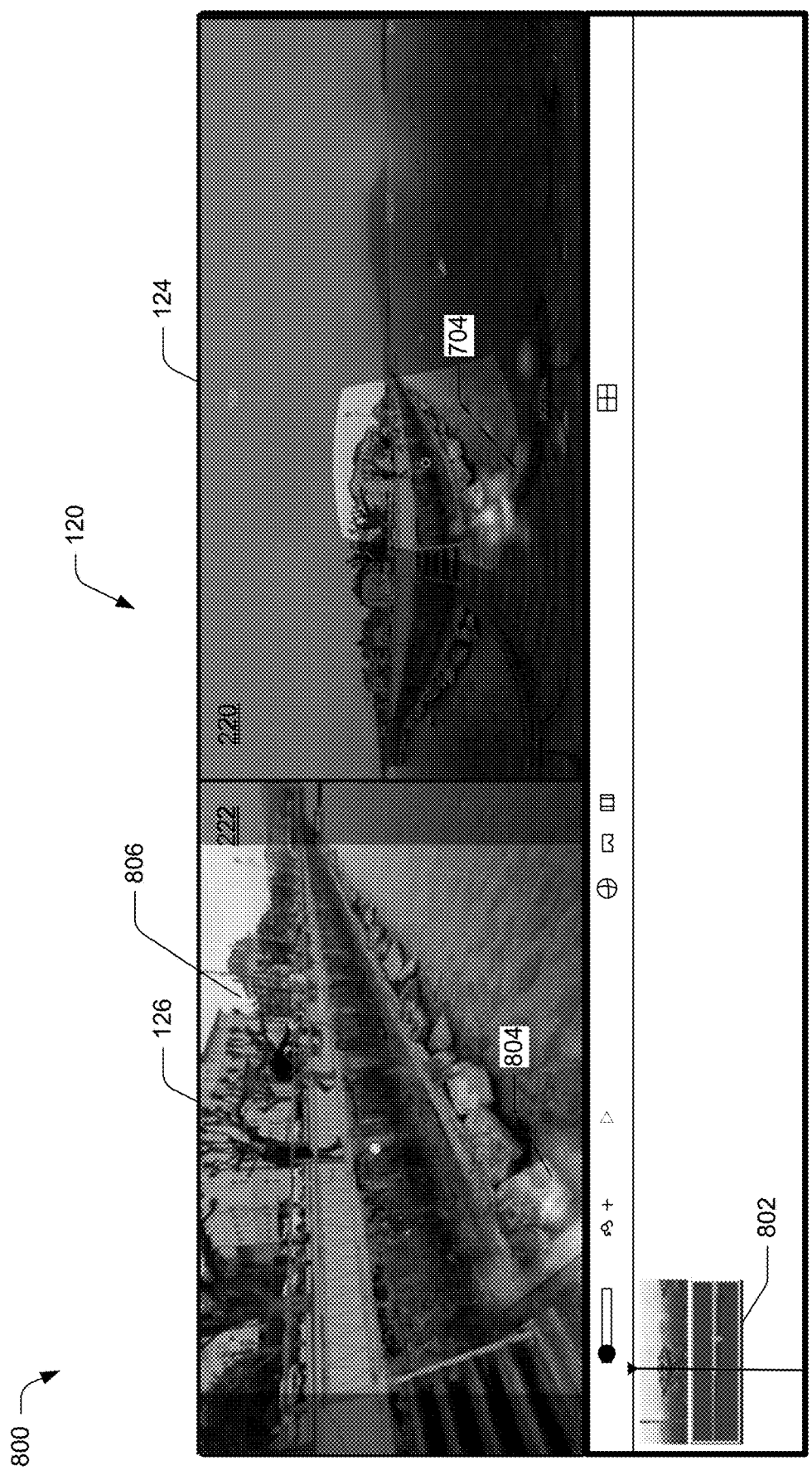
FIGS. 8A and 8B illustrate examples of direct manipulation of spherical audio in accordance with one or more implementations.
Figure 8B:
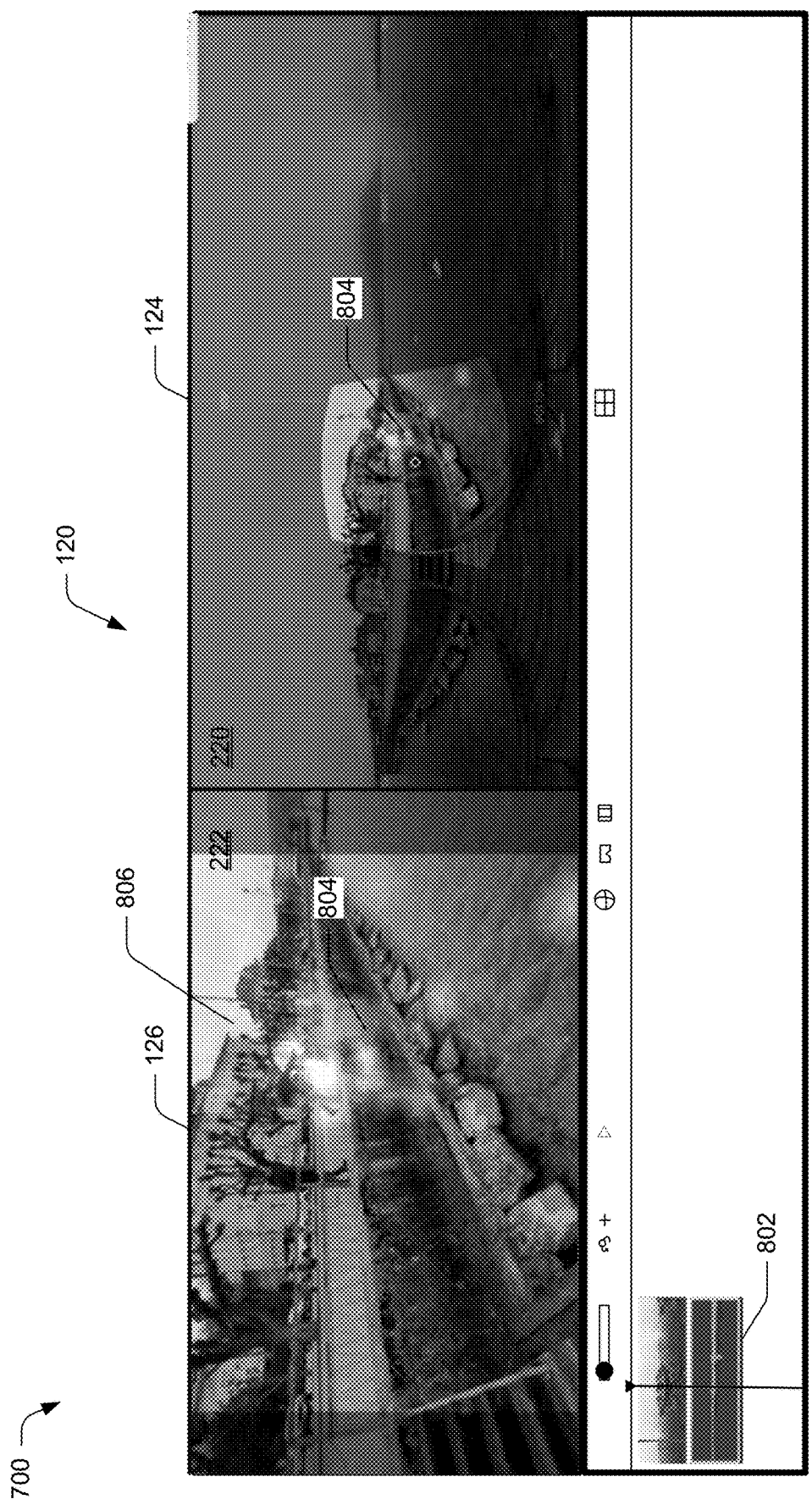

Consider, for example, FIGS. 8A and 8B which illustrate examples 800 of direct manipulation of spherical audio in accordance with one or more implementations. In FIG. 8A, the user has loaded a spherical audio file 802 into the content editing application 104. The content editing application 104 displays visual elements 804 indicative of the spherical audio, so that the user can see the source of the audio and visualize the audio in 3D space. The visual elements 804 are displayed in both the compositor portion and the navigator portion of the user interface 120.

The visual elements 804 may be generated by a spatial audio visualization system which determines properties for selected time segment of the spherical audio. Such properties can include the position the audio is coming from, the intensity of the audio, how focused the audio is, and the frequency of the audio. A time segment can be represented using a visual element 804, depicted as a particle or blob. Each property of the spherical audio can be conveyed to a user via a distinct visual aspect, or attribute, associated with a visual element 804. Advantageously, such presentation of properties of spherical audio at time segments allows users to visualize where sounds are coming from in the spherical video at different times. As such, aligning the sound with corresponding objects in the spherical video can be performed in a more efficient and effective manner. The user will also be able to hear, in real time, the spherical audio 114 while manipulating it. Further discussion of visual elements for spatial audio may be found in U.S. patent application Ser. No. 15/814,254, filed Nov. 15, 2017 and titled "Particle-Based Spatial Audio Visualization", the entire disclosure of which is hereby incorporated by reference."

Additionally, the content editing application 104 displays a textured grid 806 in the compositor portion 126 to indicate that the spherical audio 114 can be directly manipulated by the user. In many cases, the spherical audio may be offset from the spherical video in position and/or time. For example, in FIG. 8A, a person in the spherical video is shaking a bag, which generates audio. However, the visual elements 804 of the spherical audio indicate that the spherical audio from the bag shaking is originating at a position below the person shaking the bag. The content editing application 104 makes it easy for the user to correct this offset and align the spherical audio with the spherical video via direct manipulation of the spherical audio. For example, the user can click and drag the spherical audio sphere to align the visual elements 804 of the spherical audio with the source of the audio in the spherical video, which in this example is the user shaking the bag. In FIG. 8B, for example, the user has dragged the spherical audio so that the visual elements 804 are now positioned by the user shaking the bag in the spherical video 112.

The content editing application 104 also enables the user to add mono audio 118 to the spherical video 112, and to directly manipulate the mono audio 118 in a manner similar to the direct manipulation of visual objects 116. When mono audio 118 is first added to the content editing application 104, the content editing application 104 displays the mono audio file with a direct manipulation control in the form of a visual audio icon. The visual audio icon can then be selected and dragged to position the mono audio at any position within the spherical video 112.

Figure 9:
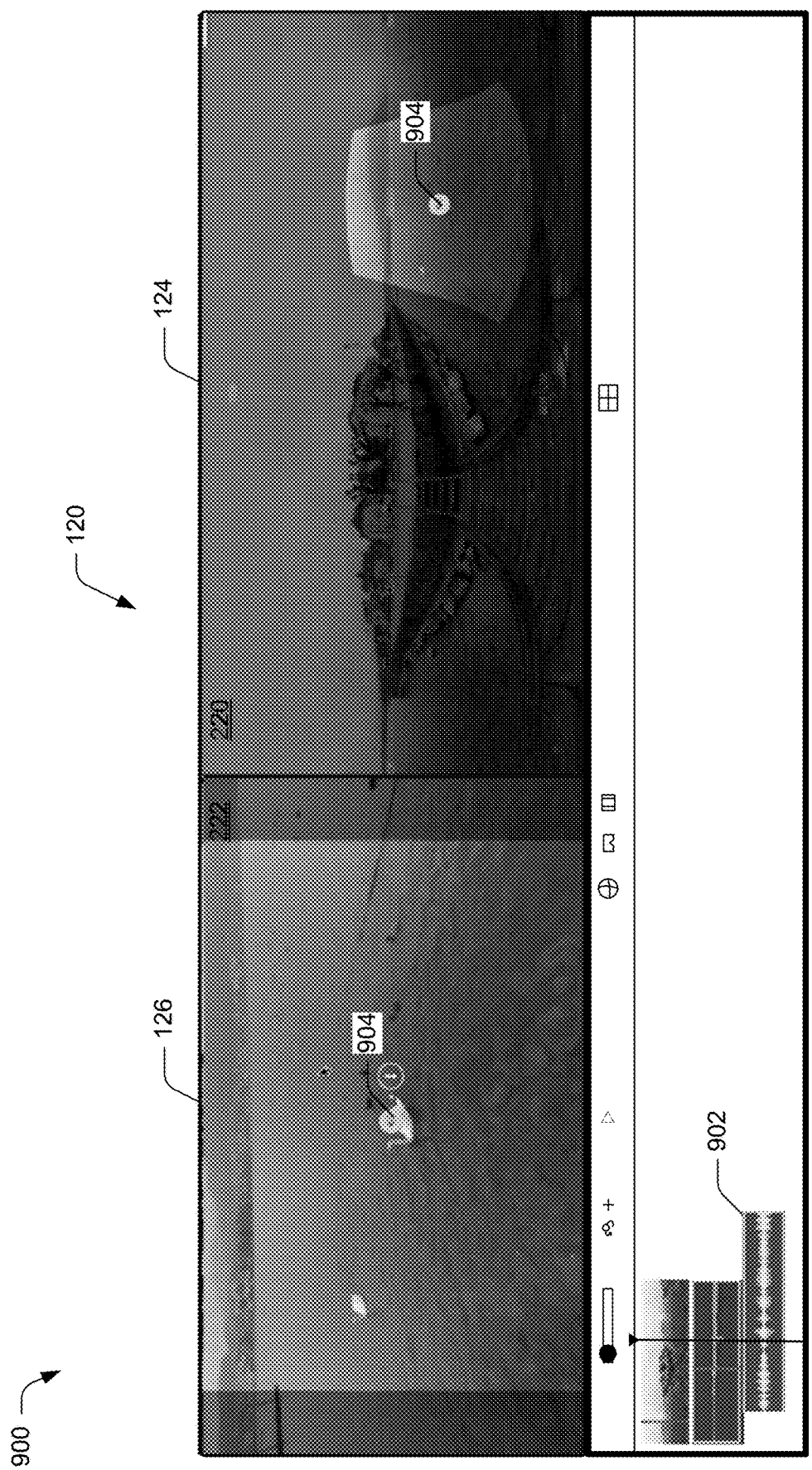
FIG. 9 illustrates an example of direct manipulation of mono audio in accordance with one or more implementations.

Consider, for example, FIG. 9 which illustrates an example 900 of direct manipulation of mono audio in accordance with one or more implementations.

In this example, assume that a spherical audio microphone failed to properly capture audio associated with birds in the lake. In this case, as a post processing step, audio associated with these birds can be captured using a mono microphone. The user can then add the mono audio file to the spherical video 112. When the mono audio file is added, the content editing application 104 displays an indicator 902 of the mono audio file and a visual audio icon 904 of the mono audio file. The visual audio icon 904 can then be selected and dragged, via user input to either the compositor portion or the navigator portion of the user interface 120, to place the mono audio file at any location within the immersive environment. For example, in FIG. 9, the user has dragged and positioned the visual audio icon directly over the swan in the lake.

Example Procedures

The content editing application 104 may be further implemented to establish a connection to a head-mounted display device, and enable navigation through the user interface 120 to be controlled by a user wearing the head-mounted display device. For example at any given moment in time, the navigational portion of the user interface 120 displays a 2D equirectangular projection of the 3D environment around the user in the virtual environment at that given time while the planar spherical view will display whatever the user is currently viewing in the head-mounted display device. Thus, as the user looks in different directions or moves through the 3D environment both views will be updated. In this way the navigation positioning and display of the different views is driven by a user wearing a head-mounted display device as opposed to user inputs to the user interface. For example, if the user turns his head to the left while wearing the head-mounted display device, the planar spherical view will rotate to the left.

This section describes example procedures for immersive media content navigation and editing techniques. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 10:
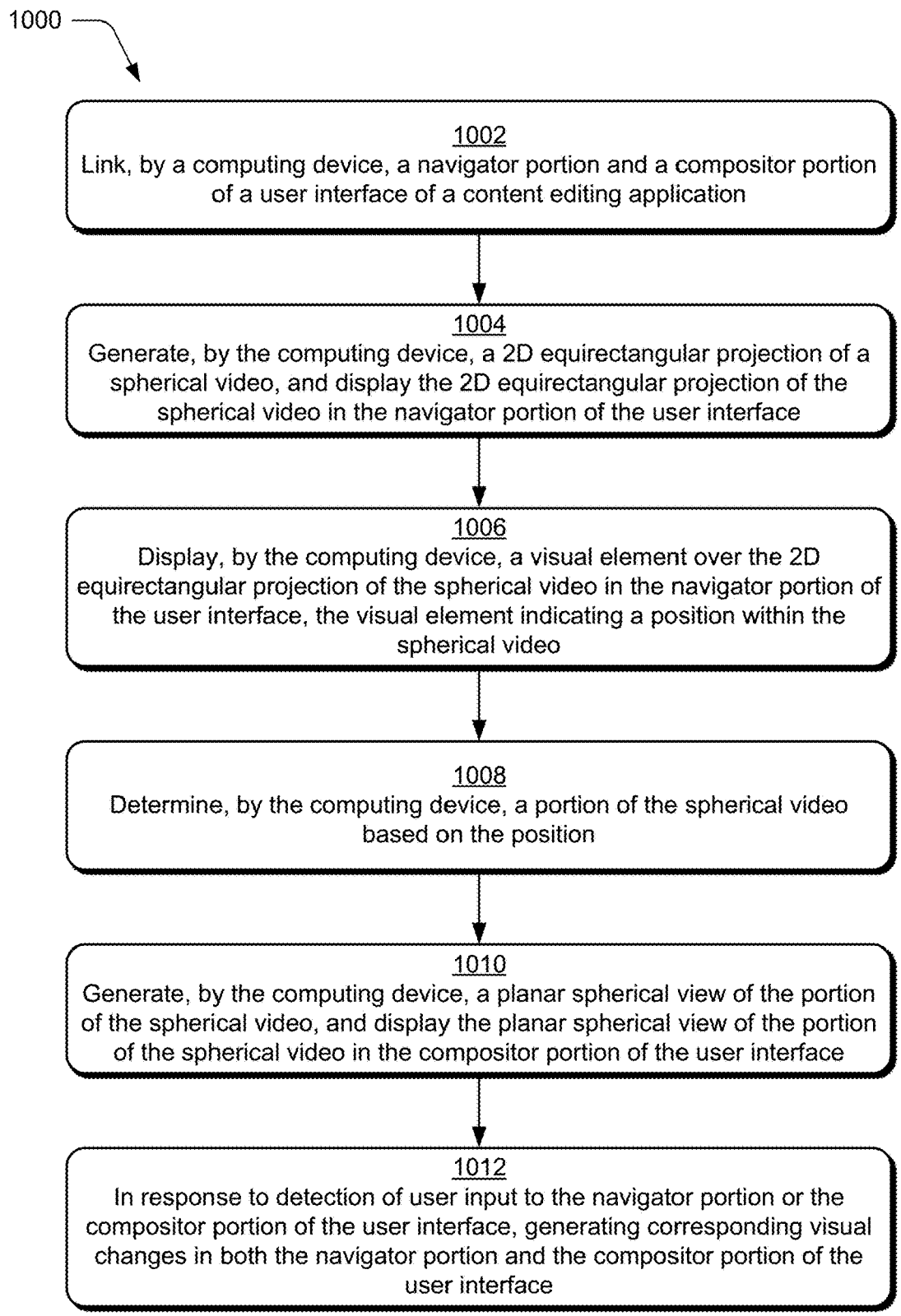
FIG. 10 depicts an example procedure of immersive media content navigation and editing techniques in accordance with one or more implementations.

FIG. 10 depicts an example procedure 1000 of immersive media content navigation and editing techniques in accordance with one or more implementations.

A navigator portion and a compositor portion of a user interface of a content editing application are linked by a computing device (block 1002). By way of example, content editing application 104 links navigator portion 124 and compositor portion 126 of user interface 120.

A 2D equirectangular projection of a spherical video is generated by the computing device and displayed in the navigator portion of the user interface of the content editing application (block 1004). By way of example, content editing application 104 generates a 2D equirectangular projection 220 of spherical video 112, and display the 2D equirectangular projection 220 in navigator portion 124 of user interface 120.

A visual position indicator is displayed by the computing device over the 2D equirectangular projection of the spherical video in the navigator portion of the user interface, where the visual position indicator indicates a position within the spherical video (block 1006). For example, content editing application 104 displays a visual position indicator 224 which indicates a position 204 within the spherical video 112.

A portion of the spherical video is determined by the computing device based on the position (block 1008). For example, a portion determination module 210 of the content editing application 104 determines a portion 212 of the spherical video 112 based on the position 204.

A planar spherical view of the portion of the spherical video is generated by the computing device and the planar spherical view of the portion of the spherical video is displayed in the compositor portion of the user interface (block 1010). For example, the content editing application 104 generates and displays a planar spherical view 222 of the portion 212 of the spherical video 112 in compositor portion 126 of the user interface 120.

In response to detection of user input to the navigator portion of the compositor portion of the user interface, corresponding visual changes are generated in both the navigator portion and the compositor portion of the user interface (1012). For example, based on the link between the navigator portion 124 and the compositor portion 126, user input to either the navigator portion 124 or the compositor portion 126 of the user interface 120 causes corresponding visual changes in both the navigator portion and the compositor portion of the user interface.

Figure 11:
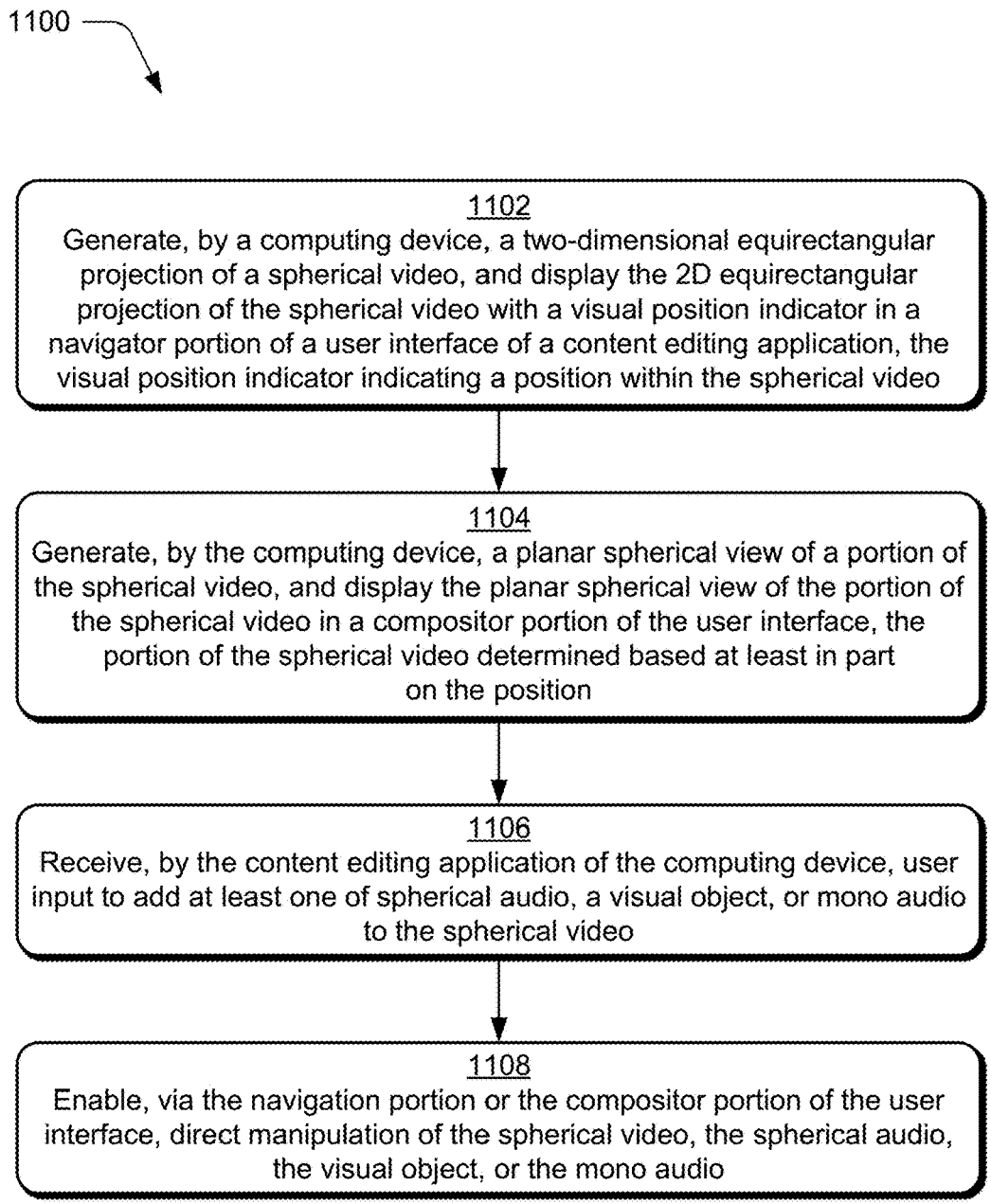
FIG. 11 depicts an additional example procedure of immersive media content navigation and editing techniques in accordance with one or more implementations.

FIG. 11 depicts an additional example procedure 1100 of immersive media content navigation and editing techniques in accordance with one or more implementations.

A two-dimensional (2D) equirectangular projection of a spherical video is generated by a computing device and the 2D equirectangular projection of the spherical video is displayed with a visual position indicator in a navigator portion of a user interface of a content editing application. The visual position indicator indicates a position within the spherical video (block 1102). By way of example, content editing application 104 generates a 2D equirectangular projection 220 of spherical video 112, and displays the 2D equirectangular projection 220 with a visual position indicator 224 in a navigator portion 124 of a user interface 120.

A planar spherical view of a portion of the spherical video is generated by the computing device, and the planar spherical view of the portion of the spherical video is displayed in a compositor portion of the user interface, where the portion is determined based at least in part on the position (block 1104). For example, the content editing application 104 generates and displays a planar spherical view 222 of the portion 212 of the spherical video 112 in a compositor portion 126 of the user interface 120.

User input to add at least one of spherical audio, a visual object, or mono audio to the spherical video is received by the content editing application of the computing device (block 1106). For example, content editing application 104 receives user input to add at least one of spherical audio 114, a visual object 116, or mono audio 118 to the spherical video 112.

Direct manipulation of the spherical video, the spherical audio, the visual object, or the mono audio via the navigator portion or the compositor portion of the user interface is enabled (block 1108). For example, the content editing application 104 enables direct manipulation of the spherical video 112, the spherical audio 114, the visual object 116, or the mono audio 118 via user input to either the navigator portion 124 or the compositor portion 126 of the user interface 120.

Having described example procedures in accordance with one or more implementations, consider now an example system and device that can be utilized to implement the various techniques described herein.

Example System and Device

Figure 12:
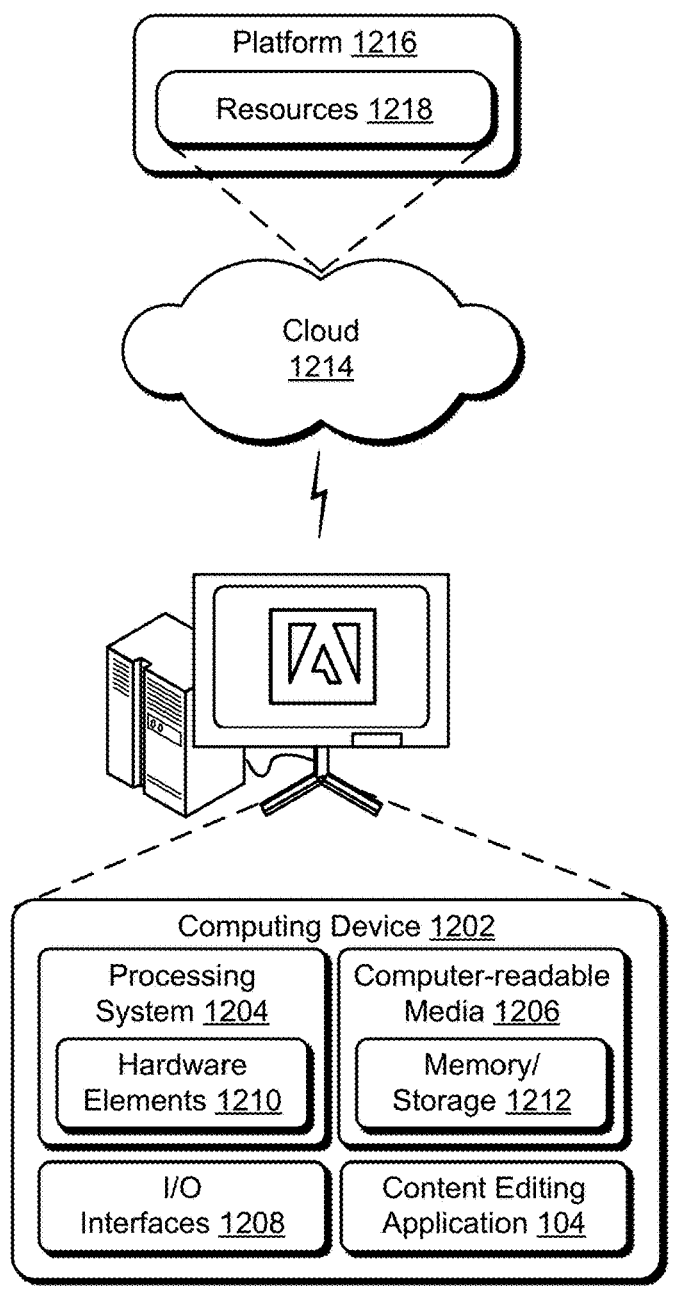
FIG. 12 illustrates an example system that includes an example computing device that is representative of one.

FIG. 12 illustrates an example system generally at 1200 that includes an example computing device 1202 that is representative of one or more computing systems and/or devices that may implement the various techniques described herein. This is illustrated through inclusion of the content editing application 104. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by a computing device, the method comprising:
   linking, by the computing device, a navigator portion and a compositor portion of a user interface of a content editing application;
   generating, by the computing device, a two-dimensional (2D) equirectangular projection of a spherical video, and displaying the 2D equirectangular projection of the spherical video in the navigator portion of a user interface;
   displaying, by the computing device, a visual position indicator over the 2D equirectangular projection of the spherical video in the navigator portion of the user interface, the visual position indicator indicating a position within the spherical video;
   determining, by the computing device, a portion of the spherical video based on the position;
   generating, by the computing device, a planar spherical view of the portion of the spherical video, and displaying the planar spherical view of the portion of the spherical video in the compositor portion of the user interface; and
   in response to detection of user input to the navigator portion or the compositor portion of the user interface, generating corresponding visual changes in both the navigator portion and the compositor portion of the user interface.

2. The method as described in claim 1, further comprising:
   receiving, via the navigator portion of the user interface, user input to navigate to a different position within the spherical video;
   displaying, by the computing device, the visual position indicator at the different position within the spherical video in the navigator portion of the user interface;
   determining, by the computing device, a different portion of the spherical video based on the different position; and
   displaying, by the computing device, the planar spherical view of the different portion of the spherical video in the compositor portion of the user interface.

3. The method as described in claim 1, further comprising:
   receiving, via the compositor portion of the user interface, user input to navigate to a different position within the spherical video:
   determining, by the computing device, a different portion of the spherical video based on the different position;
   generating, by the computing device, the planar spherical view of the different portion of the spherical video, and displaying the planar spherical view of the different portion of the spherical video in the compositor portion of the user interface; and
   displaying, by the computing device, the visual position indicator at the different position within the spherical video in the navigator portion of the user interface.

4. The method as described in claim 1, wherein the determining the portion of the spherical video further comprises determining the portion of the spherical video based on the position and a field-of-view of a head-mounted display device.

5. The method as described in claim 1, further comprising adjusting the field-of-view of the portion of the spherical video in response to selection of different head-mounted display device from a field-of-view control of the user interface, the field-of-view control including a listing of multiple head-mounted-display devices with different corresponding field-of-views.

6. The method as described in claim 1, further comprising generating, by the computing device, a positional grid and displaying the positional grid over the 2D equirectangular projection of the spherical video to indicate directions within the spherical video.

7. The method as described in claim 1, further comprising enabling rotation of the spherical video via user input to the navigator portion or the compositor portion of the user interface.

8. The method as described in claim 1, further comprising:
   receiving user input to add a visual object to the spherical video;
   displaying the visual object in both the navigator portion and the compositor portion of the user interface; and
   enabling direct manipulation of the visual object via user input to either the navigator portion or the compositor portion of the user interface.

9. The method as described in claim 1, further comprising:
   receiving user input to add spherical audio to the spherical video; and
   displaying, in the navigator portion and the compositor portion of the user interface, visual elements indicative of sources of the spherical audio.

10. The method as described in claim 9, further comprising enabling rotation of the spherical audio via user input to the navigator portion or the compositor portion of the user interface.

11. The method as described in claim 1, further comprising
   receiving user input to add mono audio to the spherical video;
   displaying, in both the navigator portion and the compositor portion of the user interface, a visual audio icon to represent a position of the mono audio within the spherical video; and
   enabling direct manipulation of the visual audio icon via user input to either the navigator portion or the compositor portion of the user interface to change a source of the mono audio within the spherical video.

12. In a digital medium environment to navigate spherical video, a computing device comprising:
   a processing system;
   a display device; and
   a computer-readable storage medium having instructions stored thereon that, responsive to execution by the processing system, causes the processing system to perform operations comprising:
      generating a two-dimensional (2D) equirectangular projection of a spherical video;
      displaying, on the display device, the 2D equirectangular projection of the spherical video and a visual position indicator in a navigator portion of a user interface of a content editing application, the visual position indicator indicating a position within the spherical video;
      generating a planar spherical view of a portion of the spherical video;
      displaying, on the display device, the planar spherical view of the portion of the spherical video in a compositor portion of the user interface, the portion of the spherical video determined based on the position;
      receiving, via the navigator portion or the compositor portion of the user interface, user input to navigate to a different position within the spherical video; and displaying corresponding visual changes in both the navigator portion and the compositor portion of the user interface.

13. The computing device as described in claim 12, wherein the user input comprises user input to the navigator portion to: select the different position within the 2D equirectangular projection, or move the visual position indicator to the different position.

14. The computing device as described in claim 12, wherein the user input comprises user input to the compositor portion of the user interface to navigate to the different position.

15. The computing device as described in claim 12, wherein the displaying the corresponding visual changes comprises:
    displaying, on the display device, the visual element at the different position within the equirectangular projection of the spherical video in the navigator portion of the user interface;
    determining a different portion of the spherical video based on the different position; and
    displaying, on the display device, the planar spherical view of the different portion of the spherical video in the compositor portion of the user interface.

16. In a digital medium environment, a method implemented by a computing device, the method comprising:
    generating, by the computing device, a two-dimensional (2D) equirectangular projection of a spherical video;
    displaying, by the computing device, the 2D equirectangular projection of the spherical video and a visual position indicator in a navigator portion of a user interface of a content editing application, the visual position indicator indicating a position within the spherical video;
    generating, by the computing device, a planar spherical view of a portion of the spherical video, the portion of the spherical video determined based at least in part on the position;
    displaying, by the computing device, the planar spherical view of the portion of the spherical video in a compositor portion of the user interface;
    receiving, by the computing device, user input to add at least one of spherical audio, a visual object, or mono audio to the spherical video; and
    enabling, via the navigation portion or the compositor portion of the user interface, direct manipulation of the spherical video, the spherical audio, the visual object, or the mono audio.

17. The method as described in claim 16, wherein the user input comprises user input to add the visual object, and wherein the method further comprises:
    displaying the visual object in both the navigator portion and the compositor portion of the user interface; and
    enabling direct manipulation of the visual object to move, rotate, or resize the visual object.

18. The method as described in claim 16, wherein the user input comprises user input to add spherical audio to the spherical video, and wherein the method further comprises:
    displaying, in the navigator portion and the compositor portion of the user interface, visual elements indicative of sources of the spherical audio; and
    enabling direct manipulation of the spherical audio to rotate the spherical audio.

19. The method as described in claim 16, wherein the user input comprises user input to add mono audio to the spherical video, and wherein the method further comprises:
    displaying, in both the navigator portion and the compositor portion of the user interface, a visual audio icon to represent a position of the mono audio within the spherical video; and
    enabling direct manipulation of the visual audio icon to change a position of a source of the mono audio within the spherical video.

20. The method as described in claim 16, wherein the portion of the spherical video is determined based at least in part on a field-of-view of a head-mounted display device.

* * * * *

UNITED STATES PATENT AND TRADEMARK OFFICE
CERTIFICATE OF CORRECTION

PATENT NO. : 10,649,638 B2
APPLICATION NO. : 15/889628
DATED : May 12, 2020
INVENTOR(S) : Yaniv De Ridder, Michael Spencer Cragg and Benjamin Adam Farrell Page 1 of 1

It is certified that error appears in the above-identified patent and that said Letters Patent is hereby corrected as shown below:

In the Claims

Column 20, Line 30, after "comprising", insert -- : --, therefor.

Signed and Sealed this
Twenty-third Day of June, 2020

Andrei Iancu
*Director of the United States Patent and Trademark Office*